United States Patent [19]

Jones

[11] Patent Number: 5,366,404
[45] Date of Patent: Nov. 22, 1994

[54] AUXILLARY COIN DISPENSER WITH TRANSACTION DATA RECORDING AND TRANSFER MECHANISMS

[75] Inventor: Michael F. Jones, Nashua, N.H.
[73] Assignee: Telequip Corporation, Hollis, N.H.
[21] Appl. No.: 902,691
[22] Filed: Oct. 9, 1992
[51] Int. Cl.⁵ ............................................. G07D 1/06
[52] U.S. Cl. .................................. 453/2; 364/405
[58] Field of Search ............... 453/2; 364/405, 479; 902/4, 5

[56] References Cited

U.S. PATENT DOCUMENTS

| | | | |
|---|---|---|---|
| 4,070,564 | 1/1978 | Tucker | 453/2 X |
| 5,023,781 | 6/1991 | Yamato | 364/405 |

*Primary Examiner*—F. J. Bartuska
*Attorney, Agent, or Firm*—Allegretti & Witcoff, Ltd.

[57] ABSTRACT

A coin dispenser adapted for use with an electronic cash register or point-of-sale terminal which includes a key sensor for accepting a coded identification key which identifies a particular sales clerk and which maintains a record of the number of coins dispensed during that clerk's job shift. At the end of an appropriate accounting period, the stored information may be transferred to a host computer, either by a conventional data channel through a connected point-of-sale terminal, or by using a "manager's key" which serves as a data carrier between the dispenser and the host computer. The accounting functions in the automated dispenser provide the data needed to successfully employ "cash drawer accounting" procedures preferred by many retailers.

7 Claims, 2 Drawing Sheets

5,366,404

AUXILLARY COIN DISPENSER WITH TRANSACTION DATA RECORDING AND TRANSFER MECHANISMS

AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to coin dispensing systems and, more particularly, to an auxiliary coin dispenser adapted for use with an existing electronic cash register or point-of-sale terminal and incorporating transaction recording apparatus to support "cash-drawer accounting" procedures.

BACKGROUND OF THE INVENTION

Automatic coin dispensers substantially enhance the efficiency and accuracy with which retail sales transactions can be handled. Auxiliary coin dispensers which operate in conjunction with conventional electronic cash-registers or point-of-sale terminals accurately vend the number of coins to be returned to the customer based on the register's calculation of the total amount of change due, As a result, the register operator can complete each sales transaction more rapidly and more accurately.

However, conventional automatic coin vendors are incompatible with cash-drawer accounting procedures used in many stores. A cash-drawer accounting system makes each register operator responsible for the amount of currency at the sales station during the operator's shift. Typically, a new operator arrives at the station with a pre-counted collection of currency to be used for making change, and the departing operator empties the cash drawer of the remaining currency left at the end of the concluding shift. The store manager, given the register tape (or the equivalent) indicating the total cash income can verify that the amount of cash turned in at the conclusion of a shift equals the sum of cash income plus the currency originally allocated for making change. Cash-drawer accounting effectively deters petty theft and encourages careful procedures. Unfortunately, since it is typically inconvenient to remove and replace the coins in the sales station's coin dispenser at each operator shift change, the store's management is compelled to choose between the convenience of using coin dispensers and the security of cash-drawer accounting procedures.

SUMMARY OF THE INVENTION

In a principal aspect, the present invention takes the form of a cash dispenser which incorporates input means for accepting a sequence of identification codes, each of which identifies and marks the beginning of a new accounting period, typically by identifying a new register operator who will be responsible for the sales station during the next shift. In accordance with the invention, an accumulator in the coin dispenser is initialized to hold zero counts when each new identification code is received, and thereafter accumulates the total amount of coins vended during the current accounting period. When a new code is received and before the accumulator is initialized, its contents are stored in a non-volatile memory unit which stores an accounting record for each accounting period, the record indicating both the identification code associated with the period as well as the amount of coins dispensed during that period. In accordance with a further feature of the invention, data transfer means are employed to communicate the content of the data storage unit to an external utilization device, typically a host computer which uses the stored information to calculate the amount of currency (exclusive of the coins remaining in the coin dispenser) which should have been present at the end of each accounting period.

In the preferred embodiment to be described, the coin dispenser takes the form of an auxiliary unit which is connected via an available interface to a conventional electronic cash register or point-of-sale terminal. A microcontroller is employed to convert the signals received over the interface into electrical signals which operate electromechanical coin ejectors which vend the appropriate number of coins of each denomination, and the microprocessor further maintains an accumulating total of the amount of coins dispensed during the current accounting period.

A new accounting period is begun upon the receipt of an identification code. In the preferred embodiment, this code is supplied by a touch memory device which functions as a "clerk's key" holding a unique code value which identifies the clerk who is given custody of the key. The clerk's key, when placed in contact with a key probe mounted on the dispenser, delivers the identification code to the microcontroller which first stores the total for the prior accounting period in a non-volatile data storage unit, along with the identification code identifying that prior period, and initializes the accumulating total to zero values to begin the new period associated with the incoming code.

In the preferred embodiment, a second touch memory device called the "manager's key" is used to gather the transaction records stored in the data storage unit of each coin dispenser. The manager's key is brought into contact with the key probe, is identified by the microcontroller, and is then loaded with the transaction records stored in the data storage unit. The manager's key is then transported to and read by a host computer which processes the transaction data to produce the accounting reports need to perform cash-drawer accounting procedures.

DETAILED DESCRIPTION

Figure 1:
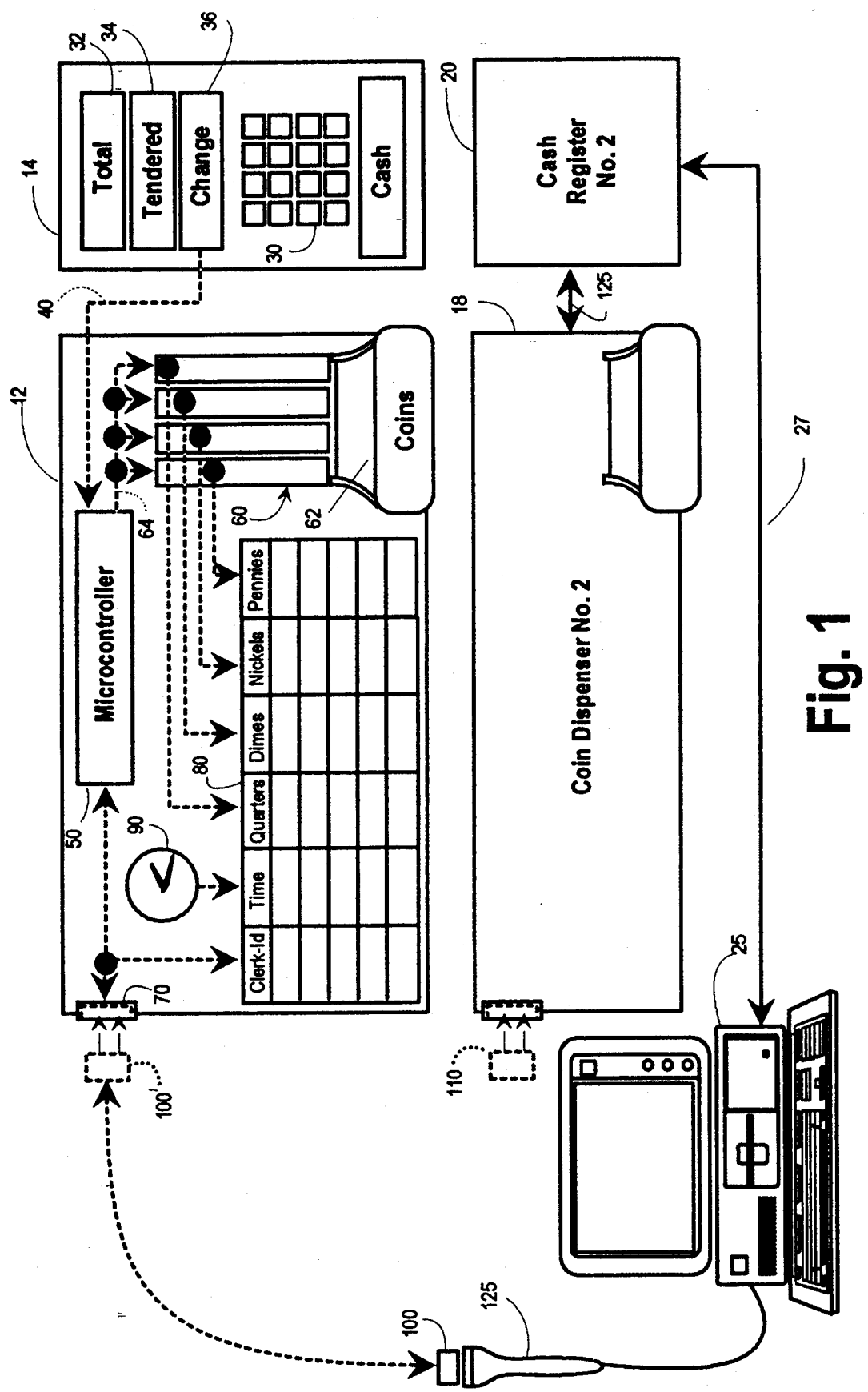
FIG. 1 is a functional, pictorial view of the preferred embodiment of the invention.

The embodiment of the invention shown in FIG. 1 is a coin dispensing system adapted for use in a retail store having one or more sales stations. At a first of these stations, a coin dispenser 12 is directly connected to a electronic cash register 14. A second sales station seen in FIG. 1 is provided with a second coin dispenser 16 connected to a point-of-sale terminal 20. The terminal 20 performs the same functions as the cash-register 14, but includes the capability of communicating directly with a host computer 25 via a data link 27. The host computer 25 processes the information generated at the individual cash dispensers using appropriate accounting routines.

The electronic cash register unit 14 is conventional an includes a keyboard 30 for accepting price or product identification information concerning items being purchased, and generates a total amount due value displayed at 32. The keyboard 30 may also be used to enter an amount tendered value displayed in the window 34 from which the amount due value is subtracted, thus yielding a change-due value displayed at 36. This change-due value is communicated over an interface 40 to a microprocessor 50 within the coin dispenser 12.

The coin dispenser 12 further includes a coin storage and vending unit indicated generally at 60 which has a capacity of 1200 coins ($113.00 total value in quarters, dimes, nickels and pennies). Each denomination is held in one or more vertical stacks from which coins are individually rended into an output tray 62 in response to microcontroller-generated commands supplied via the microcontroller output channel indicated at 64 in FIG. 1.

In accordance with the invention, the coin dispenser 12 is adapted to separately record the number of coins vended by each sales clerk during the time that clerk is responsible for the transactions at an assigned sales station. To insure that each clerk's account is properly credited with amounts rended by the coin dispenser during that clerk's shift, and to prevent intentional or accidental identification of the wrong account, each sales clerk is assigned and normally given custody of a uniquely coded key device. This key device, when placed in contact with a key probe 70 accessible from the exterior of the dispenser 12, delivers an identification code signal via the probe 70 which is ultimately stored in a writable transaction memory 80 in the dispenser 12.

The transaction memory 80 stores a plurality of records, each composed of a number of fields containing: (1) the clerk identification code obtained via the probe 70 for a particular sales clerk; (2) a time-of-day value produced by an internal clock 90 indicating time period during which transactions for a particular clerk were recorded; and (3) the number of coins vended for each denomination during that time period.

At the end of each business day, or at the conclusion of some other appropriate period, the records stored in each coin dispenser are communicated to the host computer 25 for processing. When the auxiliary coin dispenser is used with an electronic cash register having no communications capabilities, the information accumulated in each coin dispenser can be conveniently and inexpensively collected by means of a "manager's key" seen at 100 in FIG. 1. The manager's key 100 is placed in contact with the probe 70, and is then loaded with information recorded in the transaction memory 80 under the control of the microcontroller 50. The manager's key is then physically transported to a the host computer 25 and placed in electrical contact with a hand-held probe 125 connected to an available port of the computer 25. The computer 25 accepts the information from the manager key for processing into appropriate accounting reports.

Figure 2:
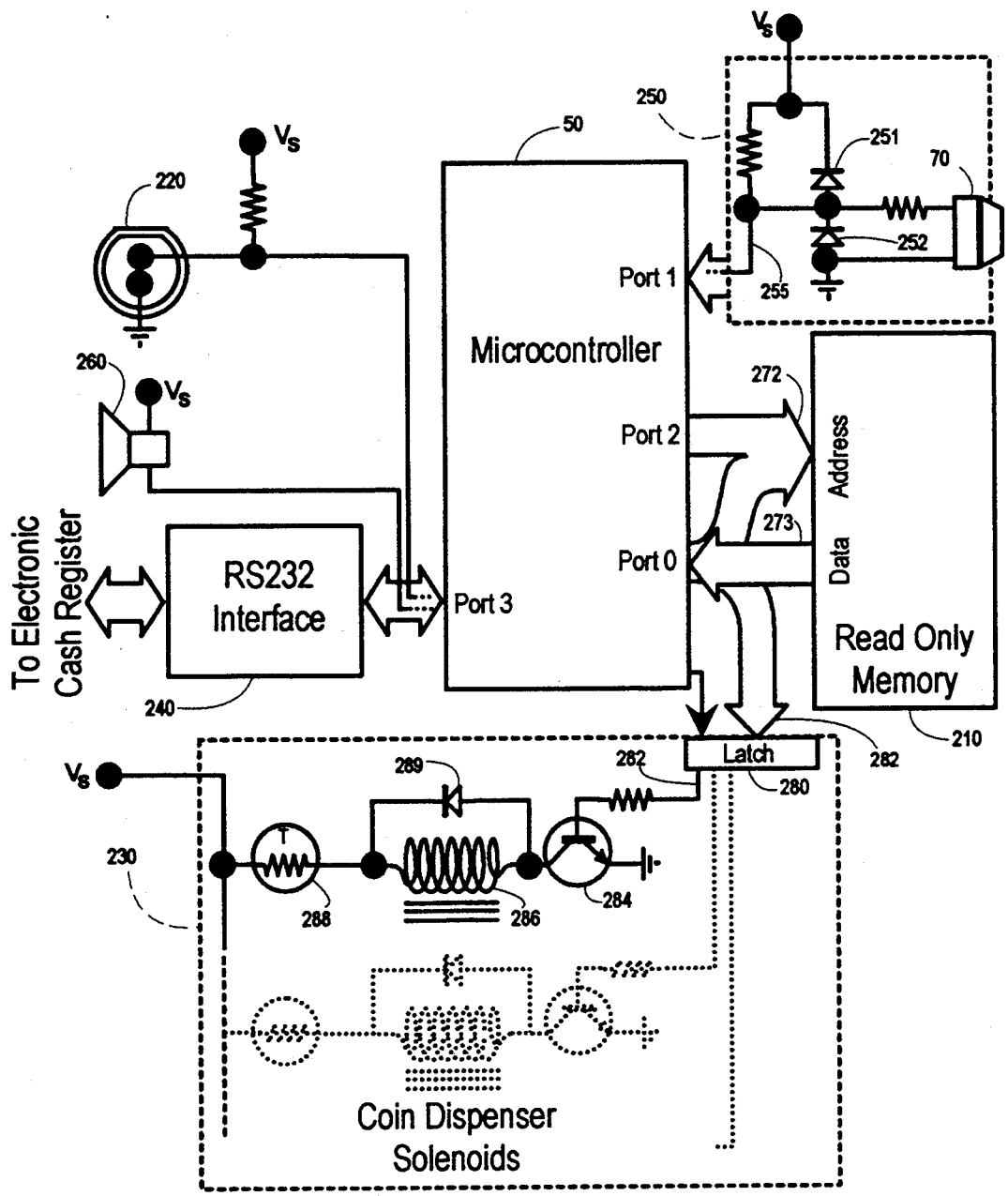
FIG. 2 is a block schematic diagram of the preferred embodiment.

When the coin vending apparatus is used in combination with a point of sale terminal such as the terminal 20 seen in FIG. 2, the information concerning the coin vending transactions may alternatively be sent via a bidirectional serial interface 125 between the dispenser 18 and the terminal 20. Terminal 20 the relays the information via the data link 27 to the central computer 120.

The manager's key 100, the clerk's key 110, as well as the internal transaction memory 80 within each coin dispenser, may be advantageously implemented by means of a "touch memory" device such as the Dallas Semiconductor Model DS1994 touch memory unit manufactured by Dallas Semiconductor Corp., Dallas, Tex. The probe 70 used in the coin dispenser may then be a Model DS9092 panel-mounted probe, and the probe 125 may be a Model DS9092G hand-held probe which includes a connecting cable terminated in a standard RJ-11 jack which may in turn be directly connected to an available RS-232 serial communications port of the computer 120.

The DS1994 touch memory devices used to implement the manager's key 100 and the internal transaction memory 80 stores 4 k bits of information. The touch memory units are encapsulated in a durable stainless steel case whose outer housing forms one terminal (ground) which is insulated from a faceplate forming the other terminal (data) of which connects via a single-wire data pathway to a host device. The DS1994 touch memory device communicates with its host using a serial digital signal having a pulse rate of 16.6 k bits per second and is accordingly able to unload or receive 4 k bits of stored information upon essentially momentary contact with its mating probe. The DS1994 touch memory contains its own internal lithium battery which, due to the low-current-drain SRAM memory components used, is able to retain stored information for more than 10 years. In addition, the DS1994 contains an internal real-time clock/calendar whose time-value registers can be read-from and written-to as part of the touch memory's address space. Accordingly, the time value stored in memory 80 may be obtained from the touch memory device (with its clock/calendar operating as the clock source 90 depicted in FIG. 1), with the time value at the time of clerk log-in being saved in the transaction memory 80 with the remainder of the record for the particular clerk shift as illustrated in FIG. 1.

The clerk's identification key may also take the form of a touch memory unit and is illustrated in FIG. 1 by the key 110 used with the second coin dispenser 18. Because the clerk's key need only contain enough information to identify the clerk, it may be conveniently implemented using the Dallas Semiconductor Model 1992 1 k-bit touch memory, which has the same physical dimensions and uses the same communications protocol as the larger model 1994 4 k bit timer.

The components that make up the coin dispenser are depicted schematically in FIG. 2. The principal components of the dispenser as seen in FIG. 2 are the microcontroller 50, a read-only memory 210 which stores the programs executed by the microcontroller 50, a touch memory unit 220 which provides non-volatile data storage and an internal clock/calendar (used to implement the transaction memory 80 and the clock 90 respectively seen in FIG. 1), a coin vending solenoid control circuit indicated generally at 230, a cash-register interface circuit seen at 240, a external touch memory probe circuit 250, and an audible tone generator 260.

The microcontroller 50 employed in the preferred embodiment shown in FIG. 2 is model 8031, a member of the MCS-51 family of microcontrollers manufactured by Intel Corporation, which uses the read-only memory 220 for program storage. The 8031 incorporates four, bi-directional, 8-bit input/output ports identified as port 0, port 1, port 2 and port 3. When addressing the external read-only memory 220, the high order address bits are delivered by the microcontroller 50 via port 2 and the low order address bits are delivered via port 0 to the address input 272 of the memory 210. Instructions from the memory are read from the data output 273 of memory 220 to the 8-bit port 0 of microcontroller 50.

Port 0 also serves as a data output port which delivers an 8-bit output signal to the latch 280 in the coin-vending solenoid control circuit 230 via a data bus 282. Each bit position in latch 280 controls a coin vending solenoid. For example, the first output bit conductor 282 controls the conductivity of a transistor switch 284 whose transconductive path is serially connected with a solenoid winding 286 and a thermistor 288 between a voltage source and ground. The thermistor 288 protects the remainder of the circuit from excessive currents by exhibiting a higher resistance when it is heated with higher currents. The flyback diode 289 provides a current path for inductive current flow when the transistor 284 turns off. The remaining seven bit positions of the latch 280 are connected to similar solenoid circuits to independently control the 8 coin supply racks holding quarters, dimes nickels and pennies.

The Intel 8031 microprocessor 50 includes a built in UART circuit associated with port 3 to provide bidirectional (multiplexed) series communication capabilities. In the 8031, pins 0 and 1 of port 3 are configurable as serial input and serial output pins respectively, and exchange data with an external electronic cash register or point of sale terminal via a standard RS-232 electrical interface 240 implemented by a model

[Insert model, manufacturer name, and brief description of U12 here].

Port 3 also provides additional single-pin input/output capabilities used to access an internal touch memory 220 and an audible tone generator 260. The single-wire communication to the touch memory 220 takes place via pin 6 of port 3 (which also functions as the external data memory write strobe). The audible tone generator 260 is connected to pin 5 of port 3.

Pin 7 of port 1 is connected to receive and transmit data via the external touch memory probe interface circuit 250 seen in FIG. 2. A pair of diodes 251 and 252 limit the voltage excursions on the conductor 255 which connects pin 6 of port 1 to the panel mounted probe 70 implemented with a model DS9092 probe connector produced by Dallas Semiconductor.

In addition to the port connections described above, the 8031 microprocessor includes several pins, not shown in the drawings, which are connected in conventional ways as follows: The power input pins $V_{cc}$ and $V_{ss}$ are energized, at power up time, with +5 volts and ground respectively. The reset input RST is connected via an RC-timing circuit to the power source to which holds the RST terminal high for at least two machine cycles to reset the microcontroller 50 at the time it is powered up, causing it to execute the initialization routine named PWRUP in the assembly language listing as discussed below. The ALE (address latch enable) pin is connected to the lower byte address input latch (not shown) in read only memory 220 and informs that latch when port 0 is presenting the low-order address bytes. The EA pin is held high to inform the processor that an external program memory is to be used. Pins XTAL1 and XTAL2 are connected to an external crystal resonating at 11.059 megahertz (chosen to provide standard data rates of 19,200 baud and downward at the serial port 3).

OPERATING CHARACTERISTICS

In order to establish a new accounting period, the person assigned to the sales station uses his or her assigned clerk's key as an electronic identification tag to quickly log-in to a coin dispenser. When the dispenser is first powered on, a single beep is issued by the tone generator 260 to indicate that the dispenser is ready to receive a clerk's key. The operator then touches to clerk's key at the probe 770, and a single beep is issued to signify that the log-in was successful and the station now ready to accept sales transactions. A double beep followed by a single beep asks the operator to attempt the log-in again. When the operator's shift is over, the system is powered down again (by turning OFF the ON/OFF switch) so that, at power up, it is ready to accept the next clerk key identification code. The internal transaction memory 80 (implemented with touch memory 220) can store up to 45 transaction records equivalent to 45 different shifts before the data is gathered. The dispenser issues an audible tone from generator 260 to indicate that the maximum number of shifts have been recorded and the records should be transferred.

When a manager's key is brought into contact with the probe 70 and the transaction records are successfully transferred to the manager's key, four short beeps followed by a long beep are issued by generator 260. Touching the manager's key to the probe 125 connected to the host computer 25 transfers the stored data into the host computer 25 via its serial port.

MICROCONTROLLER PROGRAMMING

The instructions stored in the read only memory 220 are assembled from the instructions shown in the assembly language listing which appears at the conclusion of this specification. The instructions for the Intel 8031 microprocessor may be converted into machine executable form using the Intel ASM51 macroassembler and linker/relocator programs, part no. D86ASM51, MCS-51 Assembler for PC XT or AT System, Intel Corporation, Santa Clara, Calif. 95051.

The instructions listed below, with explanatory comments, are divided into sections which be briefly summarized as follows:

A. Serial initialization and coin dispensing routines. The routine PWRUP is called by the hardware machine reset at the time power is applied to the system. After setting initial conditions, it checks the settings of a hardware DIP switch (not shown in the drawings) which is set at installation time to identify the particular electronic cash register or point of sale terminal being used. Based on the switch setting, the program at OPTION executes a jump to the routine appropriate for handling the selected register or terminal. For example, if an external cash register or terminal uses a standard serial interface following the National Semiconductor Corporation's SDL protocol, a lump is made the interface routine entry point NSC (found in section C summarized below).

B. DS1994 touch memory interface routines. The assembly language routines listed in this section handle the information flow between the 8031 microcontroller 50 and the internal touch memory 220 and an external touch memory brought into contact with the probe 70. As seen at beginning of section, the symbolic name EXTDEV is assigned to the register location of pin 6 of port 1 which is connected to the single-wire data line 255 to the probe 70 which in turn establishes the connection to an external touch memory device (manager's key or clerk's key). The symbolic name INTDEV is assigned to the register location of pin 6 of port 3, which connects to the single wire data line to the internal DS1994 touch memory 220 used for non-volatile transaction storage. The symbolic name BUZZER is assigned to the register location of pin 5 of port 3 which connects to the external tone generator 260 which serves as an alarm buzzer. The routine beginning at LOGON identifies external devices brought into contact with probe 70 and branches to ISUSER if the device is classified as a clerk's key. ISUSER records the start time of the user's shift in the transaction memory provided by the internal touch memory 220 and initializes the session's variables. If the touch device brought into contact with the probe 70 is a manager's key, the LOGON routine branches to ISMGR, which copies the data stored in the internal touch memory 220 into the manager's key.

C. NSG and IBM serial interface routines. These routines implement variations of the serial interface between the microcontroller 50 and the external cash register or point of sale terminal (illustrated at 14 and 20 respectively in FIG. 1). By way of example, if the a conventional serial port is selected, the routine beginning at entry point NSC is executed to initialize the serial port which awaits transmission from the connected terminal, which initiates all message traffic. Coin dispensing commands from the connected terminal take the form of a sequence of ASCII characters beginning with the letter "C" or "D" following an ASCII EOT code. If the command letter "C" is received, the numerical characters immediately following are indicative of the amount of change to be dispensed, with the last two numerical characters in the sequence indicating the tens and units values of the change due. The routine CALC calculates the number of quarters, dimes, nickels and pennies to be dispensed to total the fractional dollar amount of the change due. Alternatively, the command letter "D" may be used to prefix 4 numerical characters which directly indicate the number of quarters, dimes, nickels and pennies respectively to be dispensed. The change value message is terminated with an ETX character which is then followed by a check character calculated by exclusive or-ing all of the message characters and the terminating ETK character. A NAK character sent back to the terminal if the received and calculated check characters don't agree (see the routines chkbcc). The coin dispenser returns the status code MYSTS in response to each received command character, with the bit values in MYSTS having the following meaning: bit 0=1 means parity error detected; bit 1=1 if function error detected; bit 2 not used; bit 3=1 if dispensing coins; bit 4=1 if low coin alarm is on; bit 5=1 if change has been dispensed; and bit 6 always on to indicate last byte. The coin dispenser also responds to single status characters received from the connected cash register or point of sale terminal as follows: "c" received cause current MYSTS value to be returned; either "d" or "s" received causes the dispenser to return the number of quarters, dimes, nickels and pennies dispensed in the last cycle; if "f" is received the function error bit 1 in MYSTS is set; if "r" is received, the coins dispensed value is reset (the coins dispensed values must be reset with an "r" command before another coin dispensing cycle can be begun, otherwise the function error bit is set.

D. IBM interface routines. These routines provide an alternative interface to certain IBM electronic cash registers not having conventional RS-232 series ports. This interface routine uses pins 0, 1 and 2 of port 1 as clock, data and mode enable inputs respectively.

E. Centronics parallel interface routines. These routines provide a further alternative interface using port 1 as an 8-bit parallel binary interface.

F. Coin dispenser test routines. These routines for testing the operation of the dispenser are executable by setting the DIP switch (described earlier) so that the appropriate test routine is called on power up.

The assembly language listing for the instructions used in the preferred embodiment and stored, in assembled and linked form, in the read-only memory 210 appear below:

```
;       Copyright 1992, Telequip Corp., Hollis, NH
;***********************************************************;
;                       Section A
;
;       SERIAL INITIALIZATION AND COIN DISPENSING ROUTINES     ;
;
;***********************************************************;
;
; Description:
;
;       Control is initially passed to this routine on power-up or reset.
; Execution begins at the label PWRUP.  The main coin dispenser
; routines are called from one of the external test or
; interface programs when the amount of change due is determined. If needed,
; CHKALM should be called to test for alarms before dispensing.  The
; other subroutines in this module; subs, give, and STRIKE, are used by
; the dispenser routine.
```

```
        .public DISPENSE,CHKALM ; Routines to dispense change, check alarm
        .public STRIKE          ; Routine fires indicated hammer
        .public SERIAL          ; Initializes serial interface
        .public update,give     ; Routines needed for direct dispense
        .public QTRS            ; Variable needed for direct dispense
        .public BITS,SUBS,IBMGO ; Bit addressable memory locations
        .public ISRDY,PWRUP
        .extern TESTHMR,TESTDSP ; Test routines
        .extern NSC,ANSC        ; National SDL serial interface
        .extern IBM1,IBM2,IBM3  ; IBM serial interfaces
        .extern IBM4,IBM5,IBM6  ; More IBMs with different addresses
        .extern N12,N24,N48,N96 ; Standard NSC with other baud rates
        .extern IBMF,IBMR
        .extern IBMI            ; IBM interrupt handler
        .extern CENPAR          ; Centronics parallel interface
        .extern LOGON,COUNTS    ; Touch memory coin count save function
;
        .data
        .origin 8
STACK:  .ds  18                ; Reserve 18 bytes for stack
QLAST:  .ds  1                 ; Last quarter hammer struck
DLAST:  .ds  1                 ; Last dime hammer struck
PLAST:  .ds  1                 ; Last penny hammer struck
QUSED:  .ds  1                 ; Number of quarters dispensed
DUSED:  .ds  1                 ; Dimes dispensed
NUSED:  .ds  1                 ; Nickles dispensed
BITS:   .ds  2                 ; Addresses 20H, 21H reserved for bits
IBMGO:  .reg 32.0              ; Set when IBM interface ready to dispense
SUBS:   .reg 32.1              ; Set for substitution mode
ISRDY:  .reg 32.2              ; Set after login
                               ; See NVRAM.ASM for additional bit assignments
QTRS:   .ds  1                 ; Number of quarters due
DIMES:  .ds  1                 ; Dimes due
NCKLS:  .ds  1                 ; Nickles due
CENTS:  .ds  1                 ; Pennies due
ALRMS:  .ds  1                 ; Number of cycles with alarm on
HMREN   .reg P3.7              ; Hammer output enable is P3.7 (RD/)
Q1HMR   .equ 1                 ; Quarter hammers are bits 0 and 7
Q2HMR   .equ 128
D1HMR   .equ 2                 ; Dime hammers are bits 1 and 6
D2HMR   .equ 64
NHMR    .equ 32                ; Nickle hammer is bit 5
P1HMR   .equ 4                 ; Penny hammers are bits 2 , 3 and 4
P3HMR   .equ 16
; Power up initialization routine
        .code
        .origin F000H
        ljmp  PWRUP            ; Jump instruction at address 0
```

```
        .origin F00BH
        ljmp   PWRUP              ; Watchdog timer timeout reset
        .origin F013H
        ljmp   IBMI               ; IBM interface enable signal
        .origin F023H
        ljmp   sintr              ; Serial interrupt handler
        .origin F040H
PWRUP:  clr    A
        movx   @R0,A              ; Disable solenoids (any external address)
        setb   HMREN              ; Disable solenoid driver outputs
        mov    IE,A               ; Disable all interrupts
        mov    IP,A               ; Reset interrupt priority
        mov    TCON,#5            ; Stop timers
        mov    R0,#127            ; For i = 1 to 127 clear memory
clrmem: mov    @R0,A              ;   clear byte(i)
        djnz   R0,clrmem          ; End loop
        mov    SP,#STACK-1        ; Set up stack
        mov    TMOD,#21H          ; Timer 0, mode 1 (16 bit timer), no gate
                                  ; Timer 1, mode 2 (8 bit auto reload)
        mov    A,P2               ; Read switch input settings
        anl    A,#70H             ; Mask out meaningless bits
        cjne   A,#70H,pwr2        ;
        sjmp   pwr4
pwr2:   lcall  LOGON
pwr4:   setb   SUBS
        setb   ISRDY
        mov    QLAST,#Q1HMR       ; Initialize last hammer indicators
        mov    DLAST,#D1HMR
        mov    PLAST,#P1HMR
        clr    A
        lcall  STRIKE             ; Wait for switches to settle
        mov    A,P2               ; Read switch input settings
        anl    A,#F0H             ; Mask out meaningless bits
        swap   A                  ; Trade upper and lower nibbles
        mov    B,#3
        mul    AB                 ; Index to entry in jump table
        mov    DPTR,#option       ; First entry in jump table
        jmp    @A+DPTR            ; Branch to proper jump instruction
option: ljmp   NSC                ;  0 - National's SDL serial interface
        ljmp   IBM1               ;  1 - Serial IBM interface address 1
        ljmp   IBM2               ;  2 -    "       "       "       "   2
        ljmp   IBM3               ;  3 -    "       "       "       "   3
        ljmp   IBM4               ;  4 -    "       "       "       "   4
        ljmp   IBM5               ;  5 -    "       "       "       "   5
        ljmp   IBM6               ;  6 -    "       "       "       "   6
        ljmp   TESTHMR            ;  7 - Test hammers, 1 per second forever
        ljmp   N12                ;  8 - Same as National's with 1200 baud
        ljmp   N24                ;  9 - Same as National's with 2400 baud
```

```
            ljmp    N48         ; 10 - Same as National's with 4800 baud
            ljmp    N96         ; 11 - Same as National's with 9600 baud
            ljmp    IBMR        ; 12 - IBM data valid on rising clock edge
            ljmp    CENPAR      ; 13 - Centronics parallel interface
            ljmp    IBMF        ; 14 - IBM data valid on falling clock edge
            ljmp    TESTDSP     ; 15 - Automatic change dispense 1 to 99
; Coin dispenser routine
ALMIN   .reg P3.5               ; Alarm input is P3.5
STSOK   .equ 32                 ; No alarm and coins can be dispensed
STSAD   .equ 32+16              ; Alarm set but coins can still be dispensed
STSAN   .equ 16                 ; Alarm set and no coins can be dispensed
CHKALM: jb      ALMIN,noalm     ; If buzzer is sounding
        mov     R0,ALRMS        ;   then read number of alarm cycles
        cjne    R0,#4,inalm     ;     if already 4 cycles in alarm
        mov     A,#STSAN        ;       then set no coins dispensed status
        ret                     ;         and return without dispensing
inalm:  jnz     noinc
        inc     ALRMS           ;       else increment current alarm count
noinc:  mov     A,#STSAD        ;         and set status and return
        ret
noalm:  mov     ALRMS,#0        ;   else clear alarm count, set status,
        mov     A,#STSOK        ;     and return
        ret
DISPENSE:                       ; Pass amount of change to be given in A
        mov     B,#25           ; Set up to find number of quarters
        div     AB              ; A <- Quarters and B has remainder
        mov     QTRS,A          ; Save number of quaters due
        mov     A,B             ; Swap remaining change due to B
        mov     B,#10           ; Set up to find number of dimes
        div     AB              ; A <- Dimes and B has remainder
        mov     DIMES,A         ; Save number of dimes due
        mov     A,B             ; Swap remaining change due to B
        mov     B,#5            ; Set up to find number of nickles
        div     AB              ; A <- Nickles and B <- Pennies
        mov     NCKLS,A         ; Save nickles
        mov     CENTS,B         ; Save pennies
        jnb     SUBS,addem      ; If substitue mode
        acall   subs            ;   then substitute dimes and/or nickles
addem:  acall   update          ;   Update coin counts
givem:  acall   give            ; Give change
        lcall   COUNTS
        clr     A               ; Set coins dispensed status
        ret
; Routine to substitute dimes and/or nickles
QSIZ    .equ 75                 ; Number of quarters per unit length
DSIZ    .equ 102                ; Dimes per unit length
NSIZ    .equ 34                 ; Nickles per unit length (only 1 column)
subs:   clr     A               ; Make dime/nickle substitution if needed
        cjne    A,DIMES,subn    ; If no dimes due
        cjne    A,QTRS,subd     ;   then if at least 1 quarter
```

```
          sjmp   subn
subd:     mov    A,DUSED         ;       then if excess dimes
          mov    B,#QSIZ         ;           (DUSED < QUSED*DSIZ/QSIZ)
          mul    AB
          mov    R0,A
          mov    R1,B
          mov    A,QUSED
          mov    B,#DSIZ
          mul    AB
          clr    C
          subb   A,R0
          mov    A,B
          subb   A,R1
          jc     subn
          mov    A,NCKLS         ;         then if one nickle already
          jz     d2n1
          dec    QTRS            ;           then decrement quarters and
          mov    DIMES,#3        ;             give three dimes
          mov    NCKLS,#0        ;             and no nickles
          ret
d2n1:     mov    A,NUSED         ;         else if excess nickles
          mov    B,#QSIZ         ;           (NUSED < QUSED*NSIZ/QSIZ)
          mul    AB
          mov    R0,A
          mov    R1,B
          mov    A,QUSED
          mov    B,#NSIZ
          mul    AB
          clr    C
          subb   A,R0
          mov    A,B
          subb   A,R1
          jc     subn
          dec    QTRS            ;           then decrement quarters and
          mov    DIMES,#2        ;             give two dimes
          mov    NCKLS,#1        ;             and one nickle
          ret
;
subn:     clr    A
          cjne   A,NCKLS,subn0   ; If no nickles due
          cjne   A,DIMES,subn1   ;   then if at least one dime due
subn0:    ret
subn1:    mov    A,DUSED         ;     then if substitution desirable
          mov    B,#NSIZ         ;       (only substitute if there are
          mul    AB              ;         excess nickles, ie.,
          mov    R0,A            ;         NUSED < DUSED*NSIZ/DSIZ)
          mov    R1,B
          mov    A,NUSED
          mov    B,#DSIZ
```

```
               mul    AB
               clr    C
               subb   A,R0
               mov    A,B
               subb   A,R1
               jnc    subn2
               mov    NCKLS,#2            ;        then give two nickles
               dec    DIMES               ;         and one less dime
subn2:         ret
update:        mov    A,QUSED             ; Update quarter usage count
               add    A,QTRS
               mov    QUSED,A
               mov    A,DUSED             ; Add these dimes to dimes used
               add    A,DIMES
               mov    DUSED,A
               mov    A,NUSED             ; Add nickles to number already used
               add    A,NCKLS
               mov    NUSED,A
               orl    A,DUSED
               orl    A,QUSED
               jnb    A.6,done            ; If any count greater than 64
               mov    A,QUSED             ;   then divide all counters by 2
               clr    C
               rrc    A
               mov    QUSED,A
               mov    A,DUSED
               clr    C
               rrc    A
               mov    DUSED,A
               mov    A,NUSED
               clr    C
               rrc    A
               mov    NUSED,A
done:          ret
;
; Routine to dispense coins due (one at a time)
give:
               mov    R0,QTRS             ; Start by giving quarters
               cjne   R0,#0,givq          ; If quarters due
               sjmp   tstn
givq:          mov    A,QLAST             ;   then get last quarter hammer
               xrl    A,#Q1HMR.OR.Q2HMR   ;   select alternate hammer
               mov    QLAST,A             ;   save new hammer selected
               lcall  STRIKE              ;   activate selected hammer
               djnz   R0,givq             ;   loop till all quarters dispensed
tstn:          mov    R0,NCKLS
               cjne   R0,#0,givn          ; If nickles due
               sjmp   tstp
givn2:         lcall  STRIKE              ;    (wait 50 msec between nickles)
```

```
givn:   mov     A,#NHMR             ;   then select nickle hammer
        lcall   STRIKE              ;   activate selected hammer
        djnz    R0,givn2            ;   loop until all nickles dispensed
tstp:   mov     R0,CENTS
        cjne    R0,#0,givp          ; If pennies due
        sjmp    tstd
givp:   mov     A,PLAST             ;   then get last penny hammer
        cjne    A,#P3HMR,shftp      ;     if on third penny hammer
        mov     A,#P1HMR            ;       then reset to first
        sjmp    firep
shftp:  rl      A                   ;       else select next sequential hammer
firep:  mov     PLAST,A             ;   save selected new hammer
        lcall   STRIKE              ;   activate selected hammer
        djnz    R0,givp             ;   loop until all pennies dispensed
tstd:   mov     R0,DIMES
        cjne    R0,#0,givd          ; If dimes due
        ret
givd:   mov     A,DLAST             ;   then get last dime hammer
        xrl     A,#D1HMR.OR.D2HMR   ;   select alternate hammer
        mov     DLAST,A             ;   save selected new hammer
        lcall   STRIKE              ;   activate selected hammer
        djnz    R0,givd             ;   loop until all dimes dispensed
        ret
;
; Routine to fire selected hammer
STRIKE:
        jz      str1                ; If change to be given
        movx    @R0,A               ;   activate selected solenoid
        movx    @R0,A               ;   activate selected solenoid
        clr     HMREN               ;   then enable solenoids and
str1:   mov     TH0,#76             ; Load count for 50 msec wait
        mov     TL0,#1
        anl     A,#Q1HMR.OR.Q2HMR
        jz      str2                ; If quarter hammer
        mov     TH0,#4              ;   then change to 70 msec wait
        mov     TL0,#2
str2:   clr     TF0                 ; Clear timer overflow flag
        setb    TR0                 ; Start timer
        jnb     TF0,$               ; Wait for timeeut
        clr     TR0                 ; Stop timer
        clr     A                   ; Turn solenoid off
        movx    @R0,A
        setb    HMREN               ; Disable solenoids
        mov     TH0,#148            ; Load count for 30 msec wait
        mov     TL0,#0
        clr     TF0                 ; Clear timer overflow flag
        setb    TR0                 ; Start timer
        jnb     TF0,$               ; Wait for timeeut
        clr     TR0                 ; Stop timer
```

```
        ret
;
; Serial interrupt handler
        .data
        .public TSTR,TCNT
        .extern RCVR
TSTR:   .ds  11              ; Transmit data string
TCNT:   .ds  1               ; Transmit count
TPTR:   .ds  1               ; Transmit pointer
BCNT:   .ds  1               ; Break character count
        .code
SERIAL: mov   SCON,#50H      ; Serial mode 1, enable receiver
        mov   TL1,#0FFH
        mov   BCNT,#7         ; Need 7 break characters for warm reset
        setb  TR1             ; Start baud rate generator
        mov   TPTR,#TSTR      ; Reset the string pointer
        setb  ES              ; Enable serial interrupt
        setb  EA
        ret
sintr:  push  PSW             ; Save PSW and ACC
        push  ACC
        jnb   TI,rcvx         ; If transmit interrupt
        clr   TI              ;    then clear request bit
        djnz  TCNT,sndit      ;    if no more to send
        mov   TCNT,#50        ;       then wait a couple of bit times
        djnz  TCNT,$
        inc   TCNT            ;       adjust count (just in case)
        mov   TPTR,#TSTR      ;       reset the string pointer and exit
        sjmp  exint
sndit:  mov   A,R0
        mov   R0,TPTR         ;       else get pointer to next character
        inc   TPTR            ;         bump pointer for next time
        mov   SBUF,@R0        ;         read character and send it
        mov   R0,A
        sjmp  exint
rcvx:   clr   RI              ;    else clear interrupt request bit
        jnb   RB8,ferr        ;    if no framing error
        mov   BCNT,#7         ;       then reset break character count
        lcall RCVR
        sjmp  exint
;
ferr:   jnz   notbrk          ;    else if all zeros received
        djnz  BCNT,exint      ;       then if 7 breaks detected
        pop   ACC             ;         then restore PSW
        pop   PSW
        mov   DPTR,#PWRUP     ;           get reset address
        push  DPL
        push  DPH
        reti                  ;           perform warm reset
```

```
notbrk: mov    BCNT,#7            ;            else just reset break count
exint:  pop    ACC
        pop    PSW
        reti
        .end
;*****************************************************************;
;                           Section_B                             ;
;                    DS1994 INTERFACE ROUTINES                    ;
;                                                                 ;
;*****************************************************************;
        .public LOGON,COUNTS
        .extern QTRS,PWRUP,ISRDY
        .data
        .origin 62                 ; Intentional overlap with NSCIBM.ASM data
EXTDEV  .reg P1.6                  ; 1-Wire data line
INTDEV  .reg P3.6                  ; 1-Wire data line
BUZZER  .reg P3.5                  ; alarm buzzer I/O pin
NODEV   .reg 32.5
TWODEV  .reg 32.6
SELEXT  .reg 32.7
AFLAG   .reg 33.0
FRSTRD  .reg 33.1
ISSAME  .reg 33.2
ISWRIT  .reg 33.3
HAVEID  .reg 33.4
TRY     .equ 20
MINS    .ds  4
ID_NDX  .ds  1
NUMID   .ds  1
NUMSNS  .ds  1
ERRORS  .ds  1
EXTROM  .ds  8
INTROM  .ds  8
SNSX    .ds  1
PGNUM   .ds  1
TA_LOW  .ds  1
TA_HI   .ds  1
TA_STS  .ds  1
PAGE    .ds  32
        .code
LOGON:  setb   INTDEV
        setb   EXTDEV
        setb   TWODEV
        clr    SELEXT              ; Called to wait for login
        clr    HAVEID
        setb   FRSTRD
        lcall  nvinit               ; See if any devices responding
        jnb    NODEV,log4           ; Q, at least one device responding
```

```
        lcall xbeep          ; N. sound extra long beep
        sjmp  $              ;    halt operation until reset
log4:   mov   PGNUM,#16      ;    setup to read date/time page
        lcall readpg         ;    read date/time page
        mov   R0,#PAGE+16    ;    check for valid setup data
        mov   R1,#11
        lcall crc8
        jnz   log4c          ; Q, internal device setup
        mov   A,PAGE+0
        cjne  A,#38H,log4c
        mov   A,PAGE+1
        cjne  A,#50H,log4c
        mov   A,PAGE+25      ;    check number of sessions
        jnz   log8           ; Q, first logon since clear
        lcall clrpg
        sjmp  log6
log4c:  lcall dbeepn         ; N. double beep no wait and clr all pages
        lcall clrpg
log5:   dec   PGNUM
        lcall writpg
        mov   A,PGNUM
        jnz   log5
        mov   PGNUM,#16
log6:   mov   PAGE+0,#38H    ; Y. disable all interrupts
        mov   PAGE+1,#50H    ;    stop interval timer, enable oscillator
        lcall writpg         ;    write initialized page data
log8:   mov   NUMID,PAGE+24  ;    initialize number of IDs in array
        mov   NUMSNS,PAGE+25 ;    initialize number of sessions stored
        lcall sbeep          ;    sound single OKAY beep
log9:   setb  FRSTRD
loga:   setb  SELEXT         ;    loop until external device responds twice
        lcall nvinit
        jb    NODEV,log9     ;    end of loop waiting for external device
        mov   R0,#EXTROM     ;    check CRC of external device ID ROM
        mov   R1,#8
        lcall crc8
        jnz   log9           ;    continue if ROM ID CRC check passed
        jbc   FRSTRD,loga
        mov   A,EXTROM       ;    get family code of ext device
        jz    log9           ;    cannot be non-zero
        setb  HAVEID         ;
        cjne  A,#04,isusr    ; Q, external device manager's key
        ajmp  ismgr          ; Y. branch to transfer data
                             ; User logon recognized
isusr:  lcall findid         ;    search for user ID, add new and mem avail
        jz    usr0           ;    return to LOGON if no more mem avail
        ljmp  LOGON
usr0:   mov   A,NUMID
        dec   A
```

```
        mov     B,#5
        div     AB
        mov     PGNUM,#15
        xch     A,PGNUM
        subb    A,PGNUM
        mov     PGNUM,A
        mov     A,NUMSNS        ;  see if enough memory to add session
        inc     NUMSNS          ;  create new session
        mov     B,#3            ;  next session page # is NUMSNS/3
        div     AB
        cjne    A,PGNUM,usr2    ;  Q. page already used for ID storage
        lcall   lbeep           ;  Y. sound long beep to alert for mgr key
        ljmp    LOGON           ;     branch to wait for new login
usr2:   push    ACC             ;  save session page number temporarily
        mov     A,#10           ;  calculate session start address
        mul     AB
        add     A,#PAGE
        mov     SNSX,A          ;  save current session pointer
        mov     PGNUM,#16       ;  read date/time page
        lcall   readpg
        lcall   mtime           ;  save login time as count of 64 sec intvls
        mov     PAGE+0,#38H
        mov     PAGE+1,#50H
        mov     PAGE+25,NUMSNS  ;  save new values for sessions, ids in page
        mov     PAGE+24,NUMID   ;
        mov     R0,#PAGE+16     ;  calculate new CRC
        mov     R1,#10
        lcall   crc8
        mov     PAGE+26,A
        lcall   writpg          ;  write new page contents
        pop     ACC
        mov     PGNUM,A         ;  restore saved session page number
        lcall   readpg
        jz      usr4
        orl     PAGE+6,#80H
        orl     PAGE+16,#80H
usr4:   mov     R0,SNSX         ;  get pointer to start of session data
        mov     @R0,MINS        ;  record login time
        inc     R0
        mov     @R0,MINS+1
        inc     R0
        mov     @R0,#0          ;  initialize transaction count to 0
        inc     R0
        mov     @R0,ID_NDX      ;  record index into ID table in upper nybble
        mov     R1,#6
usr6:   inc     R0
        mov     @R0,#0
        djnz    R1,usr6
        lcall   writpg          ;  write page with new session data
```

```
        lcall  nvinit
        mov    R0,#MINS
usr8:   mov    @R0,#0              ;   zero memory that overlaps NSCIBM
        inc    R0
        cjne   R0,#INTROM,usr8
        lcall  sbeep               ;   sound short beep for all OKAY
        ret                        ;   return with successful login ismgr:  setb   SELEXT              ; Copy internal data to manager's key
        lcall  readpg              ; read external date/time page
        mov    R0,#PAGE+16         ; check for valid setup data
        mov    R1,#11
        lcall  crc8
        jz     mgr1                ; Q, external device setup
        clr    A                   ; N. initialize timer count to 0
        mov    PAGE+3,A
        mov    PAGE+4,A
        mov    PAGE+5,A
        mov    PAGE+6,A
        mov    PAGE+25,A
mgr1:   mov    A,PAGE+25           ; Q, TRANSACT data already loaded
        jz     mgr3
mgr2:   lcall  lbeep               ; Y. sound long beep error
        ljmp   LOGON               ;    branch to wait for another login
mgr3:   mov    MINS+0,PAGE+3       ; N. save current external timer count
        mov    MINS+1,PAGE+4
        mov    MINS+2,PAGE+5
        mov    MINS+3,PAGE+6
mgr6:   dec    PGNUM               ;   loop for all pages
        mov    A,PGNUM
        anl    A,#3
        cjne   A,#2,mgr7
        lcall  blip
mgr7:   clr    SELEXT              ;   select internal device
        lcall  readpg              ;   read page
        setb   SELEXT              ;   select external device
        lcall  writpg              ;   write page
        mov    A,PGNUM
        jnz    mgr6                ;   end of loop for all pages
        clr    SELEXT              ;   select internal device
        mov    PGNUM,#16
        lcall  readpg              ;   read internal date/time page
        mov    PAGE+0,#38H         ;   assume internal device OK from before
        mov    PAGE+1,#50H         ;   assign default status and control bytes
        mov    PAGE+16,PAGE+3      ;   save current internal time
        mov    PAGE+17,PAGE+4
        mov    PAGE+18,PAGE+5
        mov    PAGE+19,PAGE+6
        mov    PAGE+3,MINS+0       ;   restore manager's key current time
```

```
        mov     PAGE+4,MINS+1
        mov     PAGE+5,MINS+2
        mov     PAGE+6,MINS+3
        mov     PAGE+20,MINS+0    ; save manager's key recorded time
        mov     PAGE+21,MINS+1
        mov     PAGE+22,MINS+2
        mov     PAGE+23,MINS+3
        mov     R0,#PAGE+16       ; generate correct CRC
        mov     R1,#10
        lcall   crc8
        mov     PAGE+26,A
        setb    SELEXT            ; select external device
        lcall   writpg            ; copy data to external manager's key
        mov     R0,#PAGE          ; copy internal ROM ID to external scratch
        mov     R1,#INTROM
mgr8:   mov     A,@R1             ; loop to copy ROM ID bytes
        mov     @R0,A
        inc     R0
        inc     R1
        cjne    R1,#INTROM+8,mgr8 ; end of loop to copy ROM ID bytes
        mov     PGNUM,#-1         ; indicate invalid page to leave in scratch
        lcall   writpg            ; write data to external scratch
        lcall   clrpg             ; clear page
        mov     PAGE+0,#38H       ; disable all interrupts
        mov     PAGE+1,#50H       ; stop interval timer, enable oscillator
        clr     SELEXT            ; select internal device
        mov     PGNUM,#16         ; reset internal date/time page
        lcall   writpg
        lcall   sbeep
        lcall   wait2
        ljmp    LOGON             ; branch to wait for another login
clrpg:  clr     A                 ; Clear 32-byte page
        mov     R0,#PAGE
clr2:   mov     @R0,A
        inc     R0
        cjne    R0,#PAGE+32,clr2
        ret
readpg: mov     A,PGNUM           ; Read 32-byte page of DS1994
        mov     B,#32
        mul     AB
        mov     TA_LOW,A          ; Save low byte of address
        mov     TA_HI,B           ; Save high byte
        setb    FRSTRD            ; Indicate first time data read
        clr     ISWRIT
        mov     R5,#TRY+1
rdw:    djnz    R5,rdl            ; Q, more reads to try
        lcall   dbeep             ; N. sound double beep
        ljmp    PWRUP             ; restart
rdl:    lcall   nvinit            ; Loop until entire page reads same 2 times
```

```
         jb     NODEV,rdw       ;  Q, device responding
         mov    A,#0F0H         ;  Y. send DS1994 read memory command
         lcall  send8
         mov    A,TA_LOW        ;     send low byte read address
         lcall  send8
         mov    A,TA_HI         ;     send high byte read address
         lcall  send8
         setb   ISSAME          ;     initialize same data indicator
         mov    R0,#PAGE        ;     set pointer to start of page data
         mov    R1,#32          ;     loop for all 32 bytes
         mov    A,PGNUM
         cjne   A,#16,rd2
         mov    R1,#30          ;     only 30 bytes in date/time page
rd2:     mov    A,#255          ;     loop and send all ones to read data
         lcall  send8           ;        read 8 bits
         jb     ISWRIT,rd2a
         xch    A,@R0           ;        exchange with current RAM
         jb     FRSTRD,rd4
rd2a:    xrl    A,@R0           ;        xor to compare bytes
         jz     rd4             ;        Q, bytes different
         mov    A,PGNUM         ;        Y. get page number
         cjne   A,#16,rd3       ;           Q, date/time page
         mov    A,#PAGE+2       ;           Y. setup for offset compare
         subb   A,R0            ;              Q, offset >= 16
         jnc    rd4             ;              Y. don't indicate error
rd3:     clr    ISSAME          ;           N. N. clear data same indicator
rd4:     inc    R0              ;        index to next byte
         djnz   R1,rd2          ;     end of loop for 30 or 32 bytes
         jb     ISWRIT,rd6      ;     exit if checking write
         jb     SELEXT,rd5      ;     always do double read on external data
         mov    A,PGNUM
         cjne   A,#16,rd4a      ;     Q, date/time page
         sjmp   rd5             ;     Y. double read needed
rd4a:    mov    R0,#PAGE        ;     N. check CRC
         mov    R1,#32
         lcall  crc8
         jz     rd6
rd5:     jbc    FRSTRD,rdw      ;     Q, first read
         jnb    ISSAME,rdw      ;     N. Q, data same
         mov    A,#-1
rd6:     ret                    ;        Y. Y. return with good data
writpg:  mov    A,PGNUM         ; Write page data to device
         cjne   A,#-1,wr0       ; Q, last data left in scratchpad
         clr    A               ; Y. use page 0 address
wr0:     mov    B,#32           ; calculate address
         mul    AB
         mov    TA_LOW,A
         mov    TA_HI,B
         mov    R5,#TRY+1
```

```
        mov     A,PGNUM
        anl     A,#16               ; Q, date/time or last scratch-only page
        jnz     wrj                 ; Y. skip crc
        jb      SELEXT,wrj          ; N. Q, copying to external page
        mov     R0,#PAGE            ;    N. generate CRC
        clr     A
wri:    add     A,@R0
        inc     R0
        cjne    R0,#PAGE+30,wri
        mov     PAGE+30,A
        mov     R0,#PAGE
        mov     R1,#31
        lcall   crc8
        mov     PAGE+31,A
wrj:    djnz    R5,wrl              ; Q, more tries left
        lcall   dbeep               ; N. sound double beep
        ljmp    PWRUP               ;       restart
wrl:    lcall   nvinit              ; Reset devices
        jb      NODEV,wrj           ; Q, any response
        mov     A,#0FH              ; Send write scratchpad command
        lcall   send8
        mov     R0,#TA_LOW          ; Set pointer to start of page data
        mov     R1,#34              ; Loop for 32 or 34 bytes
        mov     A,PGNUM
        cjne    A,#16,wr2           ; Q, date/time page
        mov     R1,#32              ; Y. only 30 bytes this page
wr2:    mov     A,@R0               ;   get data to write
        inc     R0                  ;   index to next byte
        lcall   send8               ;   send all 8 bits
        cjne    R0,#TA_STS,wr4      ;   Q, pointing to status
        inc     R0                  ;   Y. skip
wr4:    djnz    R1,wr2              ; End of loop for 32 or 34 bytes
        lcall   nvinit              ; Q, any response
        jb      NODEV,wrj           ; N. branch to try again
        mov     A,#0AAH             ; Send read scratchpad command
        lcall   send8
        mov     R0,#TA_LOW          ; Loop to read 3 bytes address info
wr6:    mov     A,#255              ;   send all ones to read data
        lcall   send8               ;   read 8 bits
        cjne    R0,#TA_STS,wr7      ;   Q, reading status byte
        mov     @R0,A               ;   Y. save it in array
        sjmp    wr8
wr7:    xrl     A,@R0               ;   xor to compare bytes
        inc     R0
        jz      wr6                 ;   Q, bytes different
wr7c:   ljmp    wrj                 ;   Y. try again
wr8:    mov     A,PGNUM
        cjne    A,#-1,wr9
wr8c:   mov     A,#255
```

```
            lcall send8
            inc   R0
            xrl   A,@R0
            jnz   wr7c
            cjne  R0,#PAGE+8,wr8c
            ret
     wr9:   lcall nvinit            ; Q, any response
            jb    NODEV,wrj         ; N. branch to continue
            mov   A,#55H            ; Send copy scratchpad to memory command
            lcall send8
            mov   A,TA_LOW          ; Send 3-byte authorization
            lcall send8
            mov   A,TA_HI
            lcall send8
            mov   A,TA_STS
            lcall send8
            lcall wait512           ; wait for copy to finish
            setb  ISWRIT            ; set writing bit
            clr   FRSTRD            ; indicate not first read
            lcall rdw               ; verify data written
            jb    ISSAME,wra
            ljmp  wrj
     wra:   ret intini:  clr   INTDEV            ; Reset serial memory
            acall wait512           ; Hold line low for longer than 480 mmsec
            setb  INTDEV            ; Check for presence detect pulse
            setb  C                 ; Assume 12 MHz or less clock rate
            mov   R0,#128           ; 128 * 4 = 512 microsec for loop
     int2:  anl   C,INTDEV          ; Input detected low will clear C
            djnz  R0,int2
            ret
   extini:  clr   EXTDEV            ; Reset serial memory
            acall wait512           ; Hold line low for longer than 480 mmsec
            setb  EXTDEV            ; Check for presence detect pulse
            setb  C                 ; Assume 12 MHz or less clock rate
            mov   R0,#128           ; 128 * 4 = 512 microsec for loop
     ext2:  anl   C,EXTDEV          ; Input detected low will clear C
            djnz  R0,ext2
            ret
   nvinit:  clr   EA
            clr   NODEV             ; Indicate at least 1 device present
            jb    SELEXT,nvi2
            acall intini
            sjmp  nvi3
    nvi2:   acall extini
    nvi3:   setb  EA
            jc    roma
            jb    HAVEID,match
```

```
nvi4:   mov     A,#F0H              ; Load search ROM data command
        acall   send8               ; Send command to devices
        mov     R0,#INTROM          ; Pointer to internal ROM ID array
        mov     R1,#EXTROM          ; Pointer to external ID array
        mov     R2,#8               ; Setup to read 8 bytes
rom2:   mov     R3,#8               ; Loop to read 8 bytes of data
        mov     A,@R0               ;   loop to read 8 bits of data - get int ID
rom4:   acall   biti                ;     read ROM ID bit
        mov     AFLAG,C             ;     save temporarily
        acall   biti                ;     read compliment of bit
        jb      AFLAG,rom6          ;     Q, 1st read 0
        jc      rom7                ;     Y. Q, 2nd read 0
        setb    TWODEV              ;       Y. set indicator for 2 dev connected
        jnb     SELEXT,rom5         ;         Q, accessing external device
        cpl     A.0                 ;           Y. set to write cpl of internal bit
rom5:   mov     C,A.0
        sjmp    ro7c
rom6:   setb    A.0
        jnc     ro7a                ;     N.  Q, 1st and 2nd read both 1
        sjmp    roma                ;           Y. no devices responding
rom7:   clr     A.0
ro7a:   mov     C,AFLAG             ;       N. N. 1 (or 2 w/ same bit) dev respdng
ro7c:   rrc     A                   ;       select internal device (unless changed)
        acall   bito                ;       write bit to continue
        djnz    R3,rom4             ;   end of loop to read 8 bits
        jb      SELEXT,rom8         ;   Q, selecting external device
        mov     @R0,A               ;     N. copy byte read to internal ID area
        sjmp    rom9
rom8:   mov     @R1,A               ;     Y. copy byte read to external ID area
rom9:   inc     R0                  ;   point to next byte
        inc     R1
        djnz    R2,rom2             ; end of loop to read 8 bytes
        jnb     SELEXT,romc
        jb      TWODEV,romc
roma:   setb    NODEV               ; Exit with error reading device
romc:   ret
match:  mov     A,#CCH              ; Send skip rom command
        acall   send8
        ret
send8:  mov     R3,#8               ;   Send 8 bits
snd1:   rrc     A                   ;   Start of bit loop
        acall   bito
        djnz    R3,snd1             ;   End of bit loop
        rrc     A
        ret
biti:   setb    C
bito:   clr     EA                  ; Start of bit I/O routine
        jb      SELEXT,bite
        clr     INTDEV              ; start of time slot
```

```
              sjmp   $+2                ; low for wait for 6 microsec
              sjmp   $+2
              mov    INTDEV,C           ; end of synch pulse (2 microsec)
              sjmp   $+2                ; wait another 3 microsec
              sjmp   $+2
              nop
              mov    C,INTDEV           ; read input about 13 microsec from start
              mov    TH0,#255           ; wait another 65 mmsec
              mov    TL0,#200
              clr    TF0                ; Clear timer overflow flag
              setb   TR0                ; Start timer
              jnb    TF0,$              ; Wait for timeeut
              clr    TR0                ; Stop timer
              setb   INTDEV
              jnb    ISRDY,pasea
              setb   EA
      pasea:  ret
      bite:   clr    EXTDEV             ; start of time slot
              sjmp   $+2                ; low for wait for 6 microsec
              sjmp   $+2
              mov    EXTDEV,C           ; end of synch pulse (2 microsec)
              sjmp   $+2                ; wait another 3 microsec
              sjmp   $+2
              nop
              mov    C,EXTDEV           ; read input about 13 microsec from start
              mov    TH0,#255           ; wait another 65 mmsec
              mov    TL0,#200
              clr    TF0                ; Clear timer overflow flag
              setb   TR0                ; Start timer
              jnb    TF0,$              ; Wait for timeeut
              clr    TR0                ; Stop timer
              setb   EXTDEV
              jnb    ISRDY,pasea
              setb   EA
              ret
   wait512:
              mov    TH0,#254           ; Load count for 500 microsec wait
              mov    TL0,#40
              clr    TF0                ; Clear timer overflow flag
              setb   TR0                ; Start timer
              jnb    TF0,$              ; Wait for timeeut
              clr    TR0                ; Stop timer
              ret
      crc8:   mov    R4,#0              ; Loop for all bytes of data
       c82:   mov    A,@R0              ;   read data byte
              inc    R0                 ;   increment to next byte
              mov    B,#8               ;   loop for 8 data bits
       c84:   push   ACC                ;     save shifted data
              xrl    A,R4               ;     generate C to be rotated in
```

```
        rrc     A
        mov     A,R4            ;       restore crc
        jnc     c86             ;       Q, 1 bit
        xrl     A,#18H          ;       Y. xor to bits 2 and 3
c86:    rrc     A               ;       rotate with new input bit
        mov     R4,A            ;       save crc
        pop     ACC             ;       restore shifted data
        rr      A               ;       move next bit to LSB position
        djnz    B,c84           ;    end of loop for 8 bits
        mov     A,R4            ; restore crc to acc
        djnz    R1,c82          ; end of loop for all bytes
        ret findid: clr     SELEXT          ; Search internal DS1994 for external ROM ID
        mov     R6,#-1          ; Start from page 15 down
fid2:   dec     PGNUM           ; Loop for all pages with ID arrays
        lcall   readpg          ;    read page data
        mov     R1,#PAGE        ;    set pointer to 1st 6-byte ID in page
fid3:   mov     R0,#EXTROM+1    ;    set pointer to external ROM ID
        inc     R6              ;    bump to next
        mov     A,R6            ;    get array index
        cjne    A,NUMID,fid6    ;    Q, past last ID saved
        cjne    R1,#PAGE,fid4   ;    Y. Q, pointing to 1st ID in page
        mov     A,NUMSNS        ;        Y. check for page already used
        mov     B,#3
        div     AB
        cjne    A,PGNUM,fid4    ;           Q, page in use
        lcall   lbeepl          ;           Y. sound long beep
        ret                     ;              return with non-zero ACC
fid4:   mov     R2,#6           ;           N. N. loop to add ID to table
fid5:   mov     A,@R0           ;                copy from EXTROM array
        mov     @R1,A           ;                copy to page offset
        inc     R0              ;                bump indices
        inc     R1
        djnz    R2,fid5         ;              end of loop to add ID
        lcall   writpg          ;              save page data
        inc     NUMID           ;              one more ID added to table
        sjmp    fid8
fid6:   mov     R2,#6           ;      N. loop to check for 6-byte match
fid7:   mov     A,@R0
        mov     B,@R1
        cjne    A,B,fid9
        inc     R0
        inc     R1
        djnz    R2,fid7         ;         end of loop on matched chars
fid8:   mov     A,R6            ;      match found or ID added to table
        rl      A               ;      rotate index into pos as most signif 5 bits
        rl      A
        rl      A
```

```
            mov     ID_NDX,A            ; save index
            clr     A                   ; return with zero OKAY indicator
            ret
    fid9:   mov     A,R1                ; codes don't match - go to next ID string
            add     A,R2
            mov     R1,A
            cjne    A,#PAGE+30,fid3     ; branch to next string in page
            sjmp    fid2                ; end of loop for 5 IDs in a page
    mtime:  mov     B,#2
            clr     AFLAG
            mov     MINS+0,PAGE+4
            mov     MINS+1,PAGE+5
            mov     MINS+2,PAGE+3
    mt2:    mov     A,MINS+2
            rlc     A
            mov     MINS+2,A
            mov     A,MINS+0
            rlc     A
            mov     MINS+0,A
            mov     A,MINS+1
            rlc     A
            mov     MINS+1,A
            jnc     mt3
            setb    AFLAG
    mt3:    djnz    B,mt2
            jnb     AFLAG,mt4
            lcall   lbeep2
            ljmp    PWRUP
    mt4:    ret COUNTS: clr     SELEXT              ; Update coin counts in session record
            mov     A,SNSX
            add     A,#2                ; skip time bytes
            clr     AFLAG               ; initialize overflow flag
            mov     R0,A                ; set pointer to transaction count
            mov     A,@R0               ; increment 11-bit transaction count
            add     A,#1
            mov     @R0,A               ; save 8 lsbs
            inc     R0
            anl     A,#F0H              ; swap 4 msbs to lsbs
            swap    A
            mov     B,A                 ; save in B
            mov     A,@R0
            addc    A,#0                ; inc msb transaction count and 5-bit ID index
            mov     @R0,A
            inc     R0
            anl     A,#07H
            swap    A
            orl     A,B
```

```
        cjne    A,#7FH,cnt2
        setb    AFLAG
cnt2:   mov     A,@R0           ; Update pennies and nickels
        add     A,QTRS+3
        mov     @R0,A
        inc     R0
        anl     A,#F0H
        swap    A
        mov     B,A
        mov     A,QTRS+2
        swap    A
        addc    A,@R0           ; Inc lsn pennies, add msn to nickels
        mov     @R0,A
        inc     R0
        jnc     cnt3
        inc     @R0
cnt3:   anl     A,#0FH
        swap    A
        orl     A,B
        cjne    A,#-1,cnt4
        setb    AFLAG
cnt4:   cjne    @R0,#-1,cnt6
        setb    AFLAG
cnt6:   inc     R0
        mov     A,@R0           ; Update dimes and quarters
        add     A,QTRS+1
        mov     @R0,A
        inc     R0
        anl     A,#F0H
        swap    A
        mov     B,A
        mov     A,QTRS
        swap    A
        addc    A,@R0
        mov     @R0,A
        inc     R0
        jnc     cnt7
        inc     @R0
cnt7:   anl     A,#0FH
        swap    A
        orl     A,B
        cjne    A,#-1,cnt8
        setb    AFLAG
cnt8:   cjne    @R0,#-1,cnt9
        setb    AFLAG
cnt9:   lcall   writpg
        lcall   nvinit
        jnb     AFLAG,cntc
cnta:   lcall   lbeep
```

```
          sjmp   cnta
  cntc:   ret xbeep:  mov    B,#200
          acall  buzz
          ret
  lbeep2: lcall  blip
          mov    B,#20
          acall  nobz
  lbeep1: lcall  blip
          mov    B,#20
          acall  nobz
  lbeep:  mov    B,#100
          acall  buzz
  wait3:  mov    B,#150
          acall  nobz
          ret
  dbeep:  mov    B,#4
          acall  buzz
          mov    B,#2
          acall  nobz
          mov    B,#4
          acall  buzz
  wait2:  mov    B,#100
          acall  nobz
          ret
  sbeep:  mov    B,#6
          acall  buzz
          ret
  dbeepn: mov    B,#4
          acall  buzz
          mov    B,#2
          acall  nobz
          mov    B,#4
          acall  buzz
          ret
  blip:   clr    BUZZER
          mov    TH0,#94          ; Load count for 45 msec wait
          mov    TL0,#0
          clr    TF0              ; Clear timer overflow flag
          setb   TR0              ; Start timer
          jnb    TF0,$            ; Wait for timeeut
          clr    TR0              ; Stop timer
          setb   BUZZER
          ret buzz:   clr    BUZZER
  nobz:   mov    TH0,#184         ; Load count for 20 msec wait
          mov    TL0,#10
```

```
        clr     TF0              ; Clear timer overflow flag
        setb    TR0              ; Start timer
        jnb     TF0,$            ; Wait for timeeut
        clr     TR0              ; Stop timer
        djnz    B,nobz
        setb    BUZZER
        ret
serini: mov     SCON,#50H        ; Serial mode 1, enable receiver
        mov     TH1,#0FDH        ; For 9600 baud
        mov     TL1,#0FFH
        setb    TR1              ; Start baud rate generator
        setb    TI
        ret
sendit: mov     TH0,#252         ; Load count for 1 msec wait
        mov     TL0,#0
        clr     TF0              ; Clear timer overflow flag
        setb    TR0              ; Start timer
        jnb     TF0,$            ; Wait for timeeut
        clr     TR0              ; Stop timer
        clr     TI               ;   then clear request bit
        mov     SBUF,A
        ret
;       mov     A,#'R'
;       lcall   sendit
;       mov     A,PGNUM
;       add     A,#'A'
;       jnb     SELEXT,rrr
;       add     A,#20H
;  rrr: lcall   sendit
        .end
;****************************************************************;
;                         Section C                              ;
;                NSC & IBM SERIAL INTERFACE ROUTINE              ;
;                                                                ;
;****************************************************************;

; Description:
;
;       This is a serial interface handler designed to be linked
; with the scoin.asm dispensing routine.  The data link protcol
; conforms to National Semiconductor's SDL described in their
; drawing number 4260320, rev A.  The "f" command is not
; supported.  The message format is described in document
; #4260266, rev 1, sheet 42.
;       IBM's serial interface is a minor variant of National's
; with two specific differences ('r' commands are used in both):
; the baud rate is 9600 instead of 19,200; and the leading STX
; character before a message is included in vertical parity. Four
; different addresses are provided by different switch settings.
```

```
;       A special feature is that the "malfunction" status bit
; (b4) is asserted while the TRANSACT buzzer is sounding.  In
; this case, the usual 4 transactions can still take place.  The
; unassigned status bit (b5) indicates whether or not coins have
; actually been dispensed as specified in #4260266.
;       The 'd' command returns a meesage of 4 ASCII digits indicating
; the number of quarters, dimes, nickles, and pennies dispensed (in that
; order).  The counts are set in the scoin.asm dispense routine just
; before firing the hammers.  They will continue to be returned (ie. they
; are not cleared) for multiple 'd' commands between dispense cycles.
        .public NSC,ANSC,IBM1,IBM2   ; Entry points
        .public IBM3,IBM4,IBM5,IBM6  ; More entry points
        .public N12,N24,N48,N96      ; More entry points
        .public RCVR                 ; Receive character interrupt handler
        .extern DISPENSE,CHKALM      ; Coin dispenser and alarm check routine
        .extern update,give          ; Routines needed for direct dispense
        .extern QTRS                 ; Variable needed for direct dispense
        .extern SERIAL               ; Serial interface initialization
        .extern TSTR,TCNT            ; Serial interface data
        .extern STRIKE,COUNTS        ; Hammer strike routine
;
        .data
        .origin 53                   ; Needed because linker does not work
STATE:  .ds  1                       ; Receive character handler state
GETAD   .equ 0                       ;   Wait for address input
GETCM   .equ 1                       ;   Wait for command or msg start
MSGIN   .equ 2                       ;   Save message state
CHKBC   .equ 3                       ;   Verify block check character
GETEN   .equ 4                       ;   Wait for ENQ character
ACKNA   .equ 5                       ;   Wait for terminal response
WTEOT   .equ 6                       ;   Wait for EOT
NSC_R:  .ds  1                       ; Set by NSC entry for long 'r' response
MYADR:  .ds  1                       ; Data link address code
MYSTS:  .ds  1                       ; Return status code
DOCMD:  .ds  1                       ; Command status to main routine (NSCSDL)
CHKSM:  .ds  1                       ; Message checksum
INITC:  .ds  1                       ; Initial checksum value
HMR7:   .ds  1                       ; Hammer 8 (msb) for special 'P' address
HMR6:   .ds  1                       ; "       " 7
HMR5:   .ds  1                       ; "       " 6
HMR4:   .ds  1                       ; "       " 5
THOS:   .ds  1                       ; Thousands digit of change due data (QTRS)
HUNS:   .ds  1                       ; Hundreds digit (DIMES)
TENS:   .ds  1                       ; Tens digit (NCKLS)
ONES:   .ds  1                       ; Ones digit (CENTS)
ADRS:   .ds  1                       ; Received address character
LSTAT   .equ 64                      ; Last status byte indicator
GIVEN   .equ 32                      ; Change dispensed bit
ALMON   .equ 16                      ; Low coin alarm annunciated
```

```
BUSY    .equ  8                   ; In dispense cycle
FUNER   .equ  2                   ; Function error
COMER   .equ  1                   ; Communication error
NSCADR  .equ  'C'                 ; Device type identifiers
IBMAD1  .equ  '1'
IBMAD2  .equ  '2'
IBMAD3  .equ  '3'
IBMAD4  .equ  '4'
IBMAD5  .equ  '5'
IBMAD6  .equ  '6'
DIRADR  .equ  'D'
HMRADR  .equ  'P'
ZERO    .equ  '0'                 ; ASCII zero
SMALLD  .equ  'd'                 ; ASCII code for data command
SMALLR  .equ  'r'                 ; ASCII code for reset command
SMALLF  .equ  'f'                 ; ASCII code for firmware command
GIVEC   .equ  'g'                 ; Code indicates command to dispense
STX     .equ  2+80H               ; Data link control codes with parity
ETX     .equ  3
EOT     .equ  4+80H
ENQ     .equ  5
ACK     .equ  6
NAK     .equ  15H+80H
CADR    .equ  43H+80H
PAR     .reg  A.7                 ; Parity bit
DSTS    .reg  A.5                 ; Status set to give change due
;
        .code
ANSC:   mov   PCON,#80H           ; Double baud rate to get 19,200 baud
        mov   NSC_R,#1            ; Identify NSC device
        mov   MYADR,#NSCADR       ; Set address
        sjmp  ibmc
NSC:    mov   PCON,#80H           ; Double baud rate to get 19,200 baud
        mov   NSC_R,#1            ; Identify NSC device
N96:    mov   TH1,#0FDH           ; For 9600 and 19,200 baud
        sjmp  nscc                ; 9600 baud
N48:    mov   TH1,#0FAH           ; 4800 baud
        sjmp  nscc
N24:    mov   TH1,#0F4H           ; 2400 baud
        sjmp  nscc
N12:    mov   TH1,#0E8H           ; 1200 baud
nscc:   mov   MYADR,#NSCADR       ; Set address
        mov   INITC,#0            ; Set initial checksum value
        sjmp  comn
IBM1:   mov   MYADR,#IBMAD1       ; Set address
        sjmp  ibmc
IBM2:   mov   MYADR,#IBMAD2       ; Set address
        sjmp  ibmc
```

```
IBM3:   mov     MYADR,#IBMAD3   ; Set address
        sjmp    ibmc
IBM4:   mov     MYADR,#IBMAD4   ; Set address
        sjmp    ibmc
IBM5:   mov     MYADR,#IBMAD5   ; Set address
        sjmp    ibmc
IBM6:   mov     MYADR,#IBMAD6   ; Set address
ibmc:   mov     INITC,#STX      ; Set initial checksum value
        mov     TH1,#0FDH       ; For 9600 and 19,200 baud
comn:   mov     STATE,#WTEOT    ; Set initial receiver state
        mov     DOCMD,#0        ; Nothing to do
        mov     MYSTS,#LSTAT    ; Normal status lcall   SERIAL          ; Set up and enable serial interface
;
loop:   mov     A,DOCMD         ; Wait until there's something to do
        jz      loop
        lcall   CHKALM          ; Set alarm status
        anl     A,#ALMON
        orl     MYSTS,A
        mov     A,DOCMD
        mov     DOCMD,#0        ; Reset command indicator
        cjne    A,#GIVEC,poll   ; If a change due command was received
        mov     A,MYSTS
        anl     A,#GIVEN        ;    then if coins already dispensed
        jnz     rtnf            ;       then go return a function error
        lcall   CHKALM          ;       else check alarm status
        orl     MYSTS,A         ;          set return code bits
        jnb     DSTS,rtna       ;          if empty then rtn not given sts
        anl     MYSTS,#\GIVEN
        lcall   calc            ;          else calculate change due
        jb      A.7,rtnf        ;             if bad ASCII then rtn functn err
        orl     MYSTS,#GIVEN    ;             else send normal status
        mov     R0,A            ;                after saving amount due
        acall   senda
        orl     MYSTS,#BUSY     ;                set busy bit for a second
        mov     A,#DIRADR       ;                check received address
        cjne    A,ADRS,hmrd     ;                if direct address
        lcall   update          ;                   then update coin counts
        lcall   give            ;                        dispense coins
        lcall   COUNTS
        sjmp    norme
hmrd:   mov     A,#HMRADR
        cjne    A,ADRS,normd    ;                   else if hammer address
        lcall   hmrf            ;                      then fire hammers
        lcall   COUNTS
        sjmp    lpend
normd:  mov     A,R0            ;                   else retrieve amount due
        jz      norme
```

```
              lcall  DISPENSE              ;                           dispense coins
      norme:  sjmp   lpend
      rtnf:   orl    MYSTS,#FUNER          ; Return status with function error
      rtna:   acall  senda                 ; Send return status with ACK
              sjmp   lpend
      poll:   jnb    P,parok               ; If bad parity
              orl    MYSTS,#COMER          ;   then set communication error bit
              sjmp   othr
      parok:  clr    PAR                   ; else clear A.7
              cjne   A,#SMALLR,smlf        ;   if "r" command
              anl    MYSTS,#\GIVEN         ;     then clear coins dispensed bit
              mov    A,NSC_R
              cjne   A,#1,othr
              acall  respr
              sjmp   lpend
      smlf:   cjne   A,#SMALLF,smld        ;   if "f" command
              orl    MYSTS,#FUNER          ;     then set function code error bit
              sjmp   othr
      smld:   cjne   A,#SMALLD,othr        ;   if "d" command
              acall  respd                 ;     then send counts of coins dispensed
              sjmp   lpend
      othr:   acall  resp                  ; Send return message
                                           ; Clear selected status bits and loop again
      lpend:  anl    MYSTS,#\(FUNER^COMER^BUSY)
              ljmp   loop
      ;
      ; Routine calculates change due from ASCII digits
      calc:   mov    A,#DIRADR             ; Check for direct address
              cjne   A,ADRS,calch          ; if direct dispense
              mov    R1,#QTRS              ;   then set pointer to coin data
              mov    R0,#THOS              ;   set pointer to ASCII input
              mov    R2,#4                 ;   calc QTRS from THOS, DIMES from HUNS, etc.
      diglp:  mov    A,@R0                 ;   loop for all 4 digits
              clr    C
              subb   A,#ZERO
              jc     notdig                ;     carry means ASCII code < '0'
              mov    @R1,A
              subb   A,#10D
              jnc    notdig                ;     no carry means ASCII code > '9'
              inc    R0
              inc    R1
              djnz   R2,diglp              ;   end of loop
              clr    A
              ret
      calch:  mov    A,#HMRADR             ; else if hammer address
              cjne   A,ADRS,calcn
              mov    R1,#HMR7              ;   then set pointer to binary output
              mov    R0,#HMR7              ;   set pointer to ASCII input
              mov    R2,#8
```

```
        sjmp    diglp
notdig: mov     A,#-1           ; set digit error status
        ret calcn:  mov     A,TENS          ; else check for valid ASCII digits and
        mov     B,#10D          ;   calculate change due
        clr     C
        subb    A,#ZERO         ; convert ASCII digit to binary
        jc      notdig          ; carry means ASCII code < '0'
        mov     TENS,A
        subb    A,B             ; test for invalid digit
        jnc     notdig          ; no carry means ASCII code > '9'
        mov     A,ONES
        clr     C
        subb    A,#ZERO         ; convert ASCII to binary
        jc      notdig          ; C set only if code too low
        mov     ONES,A
        subb    A,B             ; now test for code too high
        jnc     notdig
        mov     A,TENS          ; get binary tens digit
        mul     AB              ; multiply by ten
        add     A,ONES          ; add ones data
        ret
; Routine sends response to poll command
resp:   mov     TSTR,#STX       ; Put STX in buffer
        mov     A,MYSTS         ; Get status code
        mov     C,P             ; P is set if odd parity
        mov     PAR,C           ; Set A.7 for even parity
        mov     TSTR+1,A        ; Put status in buffer
        mov     TSTR+2,#ETX     ; Put ETX in buffer
        xrl     A,#ETX          ; Calculate bcc
        xrl     A,INITC         ; Also need initial checksum value
        clr     PAR
        mov     C,P
        mov     PAR,C           ; Set even parity for bcc
        mov     TSTR+3,A        ; Put bcc in buffer
        mov     TCNT,#5         ; Transmit character count + 1
        setb    TI              ; Start the transmit interrupt chain
        ret
;
; Routines send responses to select sequences
senda:  mov     TSTR+1,#ACK     ; Put ACK in buffer
        sjmp    sendb
sendn:  mov     TSTR+1,#NAK     ; Put NAK in buffer
sendb:  mov     A,MYSTS         ; Put parity corrected status in buffer
        mov     C,P
        mov     PAR,C
        mov     TSTR,A
        mov     TCNT,#3         ; Two characters to send
```

```
            setb    TI                  ; Start the interrupt chain
            ret
; Routine sends response to r command for NSC
respr:      mov     TSTR,#STX           ; Put STX in buffer
            mov     A,MYSTS             ; Get status code
            mov     C,P                 ; P is set if odd parity
            mov     PAR,C               ; Set A.7 for even parity
            mov     TSTR+1,A            ; Put status in buffer
            mov     TSTR+2,#CADR
            mov     TSTR+3,#ETX         ; Put ETX in buffer
            xrl     A,#CADR             ; Calculate bcc
            xrl     A,#ETX
            xrl     A,INITC             ; Also need initial checksum value
            clr     PAR
            mov     C,P
            mov     PAR,C               ; Set even parity for bcc
            mov     TSTR+4,A            ; Put bcc in buffer
            mov     TCNT,#6             ; Transmit character count + 1
            setb    TI                  ; Start the transmit interrupt chain
            ret
; Routine sends response to d command
respd:      mov     TSTR,#STX           ; Put STX in buffer
            mov     R1,#QTRS            ;   then set pointer to coin data
            mov     R0,#TSTR+1          ;     set pointer to output
            mov     R2,#4
            mov     R3,#4
            mov     CHKSM,INITC         ;   initialize checksum
            mov     A,#HMRADR           ;   (*** CHKSM was ONES 12/13/89)
            cjne    A,ADRS,datlp        ;   if hammer address
            mov     R1,#HMR7            ;     then set pointer to binary output
            mov     R2,#8               ;       and set to return 8 digits
            mov     R3,#8
datlp:      mov     A,@R1               ;   loop for all digits
            add     A,#ZERO
            mov     C,P
            mov     PAR,C
            mov     @R0,A
            xrl     CHKSM,A
            inc     R0
            inc     R1
            djnz    R2,datlp            ;   end of loop
            mov     A,#ETX              ; Put ETX in buffer
            mov     @R0,A
            xrl     A,CHKSM
            clr     PAR
            mov     C,P
            mov     PAR,C               ; Set even parity for bcc
            cjne    R3,#4,hcnt
            mov     TSTR+6,A            ; Put bcc in buffer
```

```
            mov     TCNT,#8            ; Transmit character count + 1
            setb    TI                 ; Start the transmit interrupt chain
            ret
hcnt:       mov     TSTR+10,A
            mov     TCNT,#12
            setb    TI
            ret
; Routine fires individual hammers
hmrf:       mov     R1,#HMR7
            mov     R2,#8
            mov     R0,#128
hmr2:       mov     A,@R1
            jz      hmr6
            mov     R3,A
hmr4:       mov     A,R0
            lcall   STRIKE
            lcall   STRIKE
            djnz    R3,hmr4
hmr6:       mov     A,R0
            rr      A
            mov     R0,A
            inc     R1
            djnz    R2,hmr2
            ret
;
; Receive character interrupt handler
RCVR:       mov     A,STATE            ; Get receive state
            rl      A                  ; Adjust for 2 byte jump table
            mov     DPTR,#case
            jmp     @A+DPTR            ; Vector to current routine
case:       ajmp    getadr             ;   Wait for correct address
            ajmp    getcmd             ;   Wait for command or msg start
            ajmp    msginp             ;   Save message
            ajmp    chkbcc             ;   Verify block check
            ajmp    getenq             ;   Wait for ENQ character
            ajmp    acknak             ;   Wait for terminal response
            ajmp    geteot             ;   Wait for EOT
getadr:     mov     A,SBUF             ; Get received character
            jz      getad0
            cjne    A,#EOT,getad1      ; If EOT character
getad0:     mov     TCNT,#1            ;   stop transmit in progress
            ret
getad1:     jb      P,goback           ; Exit if parity error
            clr     PAR                ; Make sure A.7 is zero
            mov     ADRS,A             ; Save address character
            mov     STATE,#GETCM
            cjne    A,MYADR,getad2     ; If my address detected
            ret                        ;   then progress to next state
getad2:     cjne    A,#DIRADR,getad4   ;   else if direct address
```

```
         ret                        ;     then also progress
getad4:  cjne   A,#HMRADR,goback   ;   else if hammer address
         ret                        ;     then also progress
goback:  mov    STATE,#WTEOT        ;   else go back to wait for address
         ret
geteot:  mov    A,SBUF
         jz     tstadr
         cjne   A,#EOT,noteot       ; If EOT character
tstadr:  mov    STATE,#GETAD        ;   then set to address wait state
         mov    TCNT,#1             ;   and stop transmit in progress
noteot:  ret
getcmd:  mov    A,SBUF
         cjne   A,#EOT,ismsg        ; If EOT character
         mov    STATE,#GETAD        ;   then set back to address wait state
         mov    TCNT,#1             ;   and stop transmit in progress
         ret
ismsg:   cjne   A,#STX,iscmd        ; else if STX
         mov    CHKSM,INITC         ;   then initialize message checksum
         mov    HMR7,#ZERO
         mov    HMR6,#ZERO
         mov    HMR5,#ZERO
         mov    HMR4,#ZERO
         mov    THOS,#ZERO
         mov    HUNS,#ZERO
         mov    TENS,#ZERO
         mov    ONES,#ZERO
         mov    STATE,#MSGIN        ;   and set to message input state
         ret
iscmd:   mov    CHKSM,A             ; else save command in checksum byte
         mov    STATE,#GETEN        ;   and set to wait for ENQ
         ret
;
msginp:  mov    A,SBUF
         cjne   A,#EOT,isend        ; If EOT character
         mov    STATE,#GETAD        ;   then set back to address wait state
         mov    TCNT,#1             ;   and stop transmit in progress
         ret
isend:   xrl    CHKSM,A             ; else update checksum
         cjne   A,#ETX,isdat        ;   if ETX
         mov    STATE,#CHKBC        ;     then set to check bcc state
         ret
isdat:   jb     P,botch             ;   if no parity error
         clr    PAR                 ;     then clear A.7
         mov    HMR7,HMR6           ;       shift input digits
         mov    HMR6,HMR5
         mov    HMR5,HMR4
         mov    HMR4,THOS
         mov    THOS,HUNS
         mov    HUNS,TENS
```

```
             mov    TENS,ONES
             mov    ONES,A              ;           save new ones digit
             ret
botch:  inc    CHKSM               ;        else corrupt checksum for later
             ret
chkbcc: mov    A,SBUF
             jb     P,nakit             ; If no parity error
             xrl    A,CHKSM             ;   then if no bcc error
             clr    PAR                 ;     (don't include msb)
             jnz    nakit
             mov    A,MYSTS             ;   and not already busy
             anl    A,#BUSY
             jnz    ackit
             mov    DOCMD,#GIVEC        ;     then set command code
             mov    STATE,#WTEOT        ;       and reset to EOT wait
             ret                        ;       (main routine sends response)
nakit:  acall  sendn               ; Otherwise, send NAK or ACK response
             mov    STATE,#WTEOT        ;   and reset to EOT wait
             ret
ackit:  acall  senda               ; Send ACK response
             mov    STATE,#WTEOT
             ret
getenq: mov    A,SBUF
             cjne   A,#EOT,chkenq       ; If EOT character
             mov    STATE,#GETAD        ;   then set back to address wait state
             mov    TCNT,#1             ;   and stop transmit in progress
             ret
chkenq: cjne   A,#ENQ,nopol        ; If ENQ character
             mov    STATE,#ACKNA        ;   then set to wait for response
             mov    DOCMD,CHKSM         ;   and copy command for main routine
             ret                        ;     (main routine sends response message)
nopol:  mov    STATE,#WTEOT        ; else set back to EOT wait
             ret
acknak: mov    A,SBUF
             cjne   A,#EOT,acknal       ; If EOT character
             mov    STATE,#GETAD        ;   then set to address wait state
             mov    TCNT,#1             ;   and stop transmit in progress
             ret
acknal: mov    STATE,#WTEOT        ; Ignor response (retries not needed)
             ret
             .end
;***************************************************************;
;                          Section D                             ;
;                    IBM INTERFACE ROUTINES                      ;
;                                                                ;
;***************************************************************;
; Description:
;
;     This routine decodes the IBM interface signals to determine change
```

```
; due.  There are three input signals: CLK and DAT are sampled, and CDE
; generates an interrupt via P3.3 when change is to be given. Logic levels
; for DAT are valid on either the rising or falling edge of CLK, depending
; on the given interface. Two entry points are provided to handle either
; case. Signals are asserted active high at the processor pins. There are
; 16 clock pulses in a complete dispense cycle, followed by the assertion
; of CDE. Data from the first eight clocks is ignored. See the IBM
; interface documentation for more details.
        .public IBMF,IBMR,IBMI  ; Entry points for either edge triggering
        .extern DISPENSE        ; Coin dispenser routine
        .extern CHKALM          ; Alarm check routine
        .extern IBMGO,ISRDY
        .code
CLK     .reg    P1.0            ; Clock input pin
DAT     .reg    P1.1            ; Data data input pin
ENABLE  .reg    P1.2            ; Level mode ENABLE input
; Routines to wait for change due data
IBMR:   mov     DPTR,#IBMR
        clr     IBMGO           ; Set data not valid
        clr     F0
        setb    IT1             ; Set transition activated irpt
        clr     IE1             ; Reset edge flag in case already set
        setb    EX1             ; Enable P3.3 interrupt
        setb    EA              ; Enable interrupts
lopr:   jnb     CLK,$           ; Wait for active edge
        mov     C,DAT           ; Read data bit 4
        rrc     A               ; Rotate into accumulator
        clr     IBMGO           ; Set data not valid
        jb      CLK,$           ; Wait for inactive edge
        jnb     CLK,$           ; Wait for active edge
        mov     C,DAT           ; Read data bit 5
        rrc     A               ; Rotate into accumulator
        jb      CLK,$           ; Wait for inactive edge
        jnb     CLK,$           ; Wait for active edge
        mov     C,DAT           ; Read data bit 6
        rrc     A               ; Rotate into accumulator
        jb      CLK,$           ; Wait for inactive edge
        jnb     CLK,$           ; Wait for active edge
        mov     C,DAT           ; Read data bit 7
        rrc     A               ; Rotate into accumulator
        jb      CLK,$           ; Wait for inactive edge
        jnb     CLK,$           ; Wait for active edge
        mov     C,DAT           ; Read data bit 0
        rrc     A               ; Rotate into accumulator
        jb      CLK,$           ; Wait for inactive edge
        jnb     CLK,$           ; Wait for active edge
        mov     C,DAT           ; Read data bit 1
        rrc     A               ; Rotate into accumulator
```

```
         jb    CLK,$         ; Wait for inactive edge
         jnb   CLK,$         ; Wait for active edge
         mov   C,DAT         ; Read data bit 2
         rrc   A             ; Rotate into accumulator
         jb    CLK,$         ; Wait for inactive edge
         jnb   CLK,$         ; Wait for active edge
         mov   C,DAT         ; Read data bit 3
         rrc   A             ; Rotate into accumulator
         setb  IBMGO         ; Set data valid indicator
         jb    CLK,$         ; Wait for inactive edge
         sjmp  lopr IBMF:    mov   DPTR,#IBMF
         clr   IBMGO         ; Set data not valid
         setb  F0
         setb  IT1           ; Set transition activated irpt
         clr   IE1           ; Reset edge flag in case already set
         setb  EX1           ; Enable P3.3 interrupt
         setb  EA            ; Enable interrupts
lopf:    jb    CLK,$         ; Wait for active edge
         mov   C,DAT         ; Read data bit 4
         rrc   A             ; Rotate into accumulator
         clr   IBMGO         ; Set data not valid
         jnb   CLK,$         ; Wait for inactive edge
         jb    CLK,$         ; Wait for active edge
         mov   C,DAT         ; Read data bit 5
         rrc   A             ; Rotate into accumulator
         jnb   CLK,$         ; Wait for inactive edge
         jb    CLK,$         ; Wait for active edge
         mov   C,DAT         ; Read data bit 6
         rrc   A             ; Rotate into accumulator
         jnb   CLK,$         ; Wait for inactive edge
         jb    CLK,$         ; Wait for active edge
         mov   C,DAT         ; Read data bit 7
         rrc   A             ; Rotate into accumulator
         jnb   CLK,$         ; Wait for inactive edge
         jb    CLK,$         ; Wait for active edge
         mov   C,DAT         ; Read data bit 0
         rrc   A             ; Rotate into accumulator
         jnb   CLK,$         ; Wait for inactive edge
         jb    CLK,$         ; Wait for active edge
         mov   C,DAT         ; Read data bit 1
         rrc   A             ; Rotate into accumulator
         jnb   CLK,$         ; Wait for inactive edge
         jb    CLK,$         ; Wait for active edge
         mov   C,DAT         ; Read data bit 2
         rrc   A             ; Rotate into accumulator
         jnb   CLK,$         ; Wait for inactive edge
         jb    CLK,$         ; Wait for active edge
```

```
            mov    C,DAT              ; Read data bit 3
            rrc    A                  ; Rotate into accumulator
            cpl    A                  ; Invert negative true data
            setb   IBMGO              ; Set data valid indicator
            jnb    CLK,$              ; Wait for inactive edge
            sjmp   lopf IBMI:       jnb    IBMGO,error        ; If 8 bits in A
            jb     F0,int2
;           jnb    ENABLE,zero        ; ENABLE asserted high for IBMR
            sjmp   int4
    int2:   jb     ENABLE,zero        ; ENABLE asserted low for IBMF
    int4:   clr    ISRDY
            clr    IBMGO              ; Set data valid indicator false
            mov    R0,A               ; Save data
            anl    A,#0FH             ; Mask off units data leaving tens digit
            mov    B,#10              ; Load tens digit multiplier
            mul    AB
            xch    A,R0               ; Restore data and save tens data
            swap   A
            anl    A,#0FH             ; Mask off tens digit leaving units data
            add    A,R0               ; Add tens data
            jz     zero               ; If change is due
            jb     A.7,zero           ;   and its not greater than 127 cents
            mov    B,A
            clr    A
            lcall  CHKALM             ;   else check alarm status
            jnb    A.5,zero
            mov    A,B
            lcall  DISPENSE           ;   then dispense it
zero:       setb   ISRDY
            setb   EA
            reti                      ; Return from interrupt
error:      jnb    ISRDY,err2
            pop    ACC
            pop    ACC
            push   DPL
            push   DPH
    err2:   reti                      ; Return to reset the error
            .end
```

;****************************************************************;
;                        Section E                               ;
;             CENTRONICS PARALLEL INTERFACE ROUTINE              ;
;                                                                ;
;****************************************************************;
; Description:
;
;       This is a parallel, binary interface. There are 8 data bits,
; positive true at the processor pins (P1), that are valid on the leading

```
; edge of an active low strobe.  BUSY is an output line asserted active
; high when the TRANSACT is not ready to accept input (dispense cycles and
; low coin).  FAULT is a separate output that is asserted active low when
; the TRANSACT will not dispense coins.
;      The active STROBE pulse width must be at least 2.5 microseconds with
; a minimum of 10 microseconds between leading edges.  Input data must
; be held a minimum of 5 microseconds from the leading edge of STROBE.
; The STROBE input is ignored while BUSY is asserted.
;      A sequence of 6 ASCII characters must be received as follows to
; dispense coins: T, O, 'C', 'D', CR, LF.  T and O are the tens and ones
; digits.
        .public CENPAR          ; Entry point
        .extern DISPENSE,CHKALM ; Coin dispenser and alarm check routines
        .data
STROBE  .reg P3.4               ; Strobe input
BUSY    .reg P3.3               ; Busy output
FAULT   .reg P3.2               ; Fault indicator output
STSOKB  .reg A.5                ; Coins can be dispensed (from CHKALM)
        .code
;
; Routine to wait for change due data
CENPAR:
        mov     R0,#0           ; Clear change due data
        mov     R1,#0           ; Reset change dispense enable
        clr     A
        lcall   CHKALM          ; Set FAULT bit
        mov     C,STSOKB
        mov     FAULT,C
        jnc     CENPAR          ; Loop until no fault
        clr     BUSY            ; Indicate not busy
        jnb     STROBE,$
        jb      STROBE,$
        mov     R0,P1           ; Read tens digit
        jnb     STROBE,$
        jb      STROBE,$
        mov     R1,P1           ; Read ones digit
        jnb     STROBE,$
        jb      STROBE,$
        mov     R2,P1           ; Read change due enable
        jnb     STROBE,$
        jb      STROBE,$
        mov     R3,P1           ; Read change due enable
ind:    jnb     STROBE,$        ; Wait for newline
        jb      STROBE,$
        mov     A,P1
        cjne    A,#0AH,ind
        setb    BUSY
        cjne    R2,#'C',CENPAR
        cjne    R3,#'D',CENPAR
```

```
        mov    A,R0            ; Check for valid ASCII digits and
        mov    B,#10D           ; calculate change due
        clr    C
        subb   A,#'0'           ; convert ASCII digit to binary
        jc     CENPAR           ; carry means ASCII code < '0'
        mov    R0,A
        subb   A,B              ; test for invalid digit
        jnc    CENPAR           ; no carry means ASCII code > '9'
        mov    A,R1
        clr    C
        subb   A,#'0'           ; convert ASCII to binary
        jc     CENPAR           ; C set only if code too low
        mov    R1,A
        subb   A,B              ; now test for code too high
        jnc    CENPAR
        mov    A,R0             ; get binary tens digit
        mul    AB               ; multiply by ten
        add    A,R1             ; add ones data
        jz     CENPAR
        lcall  DISPENSE
        sjmp   CENPAR
.end
```

```
;********************************************************************;
;                                                                    ;
;                        Section F                                   ;
;                COIN DISPENSER TEST ROUTINES                        ;
;                                                                    ;
;********************************************************************;
; Description:
;
;    This module consists of two test routines. TESTHMR cycles through
; the hammers one at a time, in sequence. TESTDSP dispenses from 1 to 99
; cents in change in sequence.
        .public TESTHMR         ; Routine to test hammers
        .public TESTDSP         ; Routine to test coin dispenser
        .extern STRIKE          ; Hammer strike routine
        .extern DISPENSE        ; Coin dispenser routine
; Hammer and coin dispenser test routines
        .code
TESTDSP:
        setb   P1.6
        sjmp   $+2
        sjmp   $+2
        clr    P1.6
        sjmp   $+2
        sjmp   TESTDSP
        clr    A
        mov    R6,#35D          ; Setup to wait for about 3 sec
dely:   lcall  STRIKE           ;   Call with A = 0 for 50 msec delay
```

```
                djnz    R6,dely             ; End of 3 sec delay loop
                mov     R4,#99              ; Start of coin dispensing loop
                mov     R5,#00              ;   Initialize change due
count:          inc     R5                  ;   Start of inner count loop
                mov     A,R5                ;     Load change due into A
                lcall   DISPENSE            ;     Dispense change
                clr     A
                mov     R6,#30D             ;     Setup to wait for about 3 sec
wait:           lcall   STRIKE              ;       Call with A = 0 for 80 msec delay
                djnz    R6,wait             ;     End of 3 sec delay loop
                djnz    R4,count            ;   End of change count loop
                sjmp    $                   ; End of test TESTHMR:
                mov     A,#1                ; Setup to strike first hammer
loop:           rr      A                   ; Loop while in test mode
                mov     P1,A
                clr     P3.4
                setb    P3.4
                cpl     P3.3
                cpl     P3.2
                mov     R0,A                ;   Save hammer position
                mov     R1,#13D             ;   Set up to wait about 1 sec
delay:          lcall   STRIKE              ;     Fire selected hammer
                djnz    R1,delay            ;     Call again with A = 0 to delay 80 msec
                mov     A,R0                ;     then continue in loop
                sjmp    loop                ; End of test mode loop
                .end
```

What is claimed is:

1. An automatic coin dispenser for use with a point-of-sale data entry device for handling a sequence of sales transactions, said device including a keyboard for accepting, for each transaction, a purchase-price value and an amount-tendered value and further including means for calculating and displaying a change-due value based upon said purchase-price and said amount-tendered values, said coin dispenser comprising, in combination, a coin storage bin for storing a plurality of coins of different denominations, processing means responsive to said change-due value for calculating the number of coins to be dispensed for each of said denominations, coin vending means for vending the number of coins for each of said denominations as calculated by said processing means, data entry means for accepting an identification code for each of a sequence of non-overlapping time periods during each of which a sub-sequence of said transactions may occur, means including a memory for storing a data record for each of said time periods, said data record including values specifying the identification code for that period and the value of coins dispensed during that period, and and data collection means for communicating the accumulated data records for said time periods to a utilization device.

2. An automatic coin dispenser as set forth in claim 1 wherein said data entry means comprises a key interface adapted to engage with a code-carrying key which provides said identification code when said key is brought into active communication with said key interface.

3. An automatic coin dispenser as set forth in claim 2 wherein said data collection means includes a storage key unit adapted to receive said accumulated data records via said key interface.

4. An auxiliary coin dispenser for use with a cash register having data entry means for accepting from an operator price amounts and tendered amounts and for calculating change-due values based on said amounts, said coin dispenser comprising, in combination, interface means connected to said cash register for generating coin vending commands in response to said change due values, a coin ejector responsive to said vending commands for dispensing coins of different denominations, an accumulator responsive to said vending commands for accumulating total values indicative of the total amount of coins dispensed during an accounting period, input means for accepting a sequence of identification codes each of which identifies the beginning of a new accounting period, a data storage unit for storing data records in a plurality of storage locations, means responsive to the receipt of each given one of said codes for storing the total values in said accumulator at a storage location associated with the previously received identification code, and for thereafter initializing said total values in said accumulator to zero to begin the new accounting period identified by said given code, and data transfer means for periodically communicating the contents of said data storage unit to an external utilization device.

5. An auxiliary coin dispenser as set forth in claim 4 wherein said input means for accepting a sequence of identification codes comprises a connector adapted to engage with a coded key which manifests a unique one of said identification codes.

6. An auxiliary coin dispenser as set forth in claim 5 wherein said data transfer means comprises a self-contained portable memory unit adapted to engage with said connector and means coupling said connector and said data storage unit for transferring the contents of said data storage unit to said portable memory unit via said connector.

7. An auxiliary coin dispenser as set forth in claim 4 wherein said interface means is bidirectional and wherein said data transfer means comprises means for communicating the contents of said data storage unit to said external utilization device via said interface means.

* * * * *